US012739728B2

(12) United States Patent
Basu Mallick et al.

(10) Patent No.: US 12,739,728 B2
(45) Date of Patent: Sep. 15, 2026

(54) USER EQUIPMENT HANDOVER FROM A NETWORK ENERGY SAVING CELL

(71) Applicant: Lenovo (Singapore) Pte. Limited, Singapore (SG)

(72) Inventors: Prateek Basu Mallick, Dreieich (DE); Joachim Löhr, Wiesbaden (DE); Tapisha Soni, Munich (DE)

(73) Assignee: Lenovo (Singapore) Pte. Limited, Singapore (SG)

( * ) Notice: Subject to any disclaimer, the term of this patent is extended or adjusted under 35 U.S.C. 154(b) by 17 days.

(21) Appl. No.: 18/923,526

(22) Filed: Oct. 22, 2024

(65) Prior Publication Data

US 2025/0142441 A1 May 1, 2025

Related U.S. Application Data

(60) Provisional application No. 63/545,616, filed on Oct. 25, 2023.

(51) Int. Cl.
*H04W 36/36* (2009.01)
*H04W 74/0833* (2024.01)
*H04W 76/28* (2018.01)

(52) U.S. Cl.
CPC ..... *H04W 36/362* (2023.05); *H04W 74/0833* (2013.01); *H04W 76/28* (2018.02)

(58) Field of Classification Search
CPC ........... H04W 36/362; H04W 74/0833; H04W 76/28; H04W 36/00837; H04W 36/249
(Continued)

(56) References Cited

U.S. PATENT DOCUMENTS

2019/0098543 A1 3/2019 Kim et al.
2020/0045602 A1 2/2020 Jiang
2022/0038976 A1* 2/2022 Hwang ............... H04W 36/362

FOREIGN PATENT DOCUMENTS

EP 3780740 A1 2/2021
WO 2018106429 A1 6/2018
(Continued)

OTHER PUBLICATIONS

3GPP , "3rd Generation Partnership Project; Technical Specification Group Radio Access Network; NR. User Equipment (UE) procedures in Idle mode and RRC' 56 Inactive state (Release 16)", 3GPP TS 38.304 V16.7.0 [retrieved Mar. 22, 2023]. Retrieved from the Internet <http://3gpp.org>, Dec. 2021, 39 pages.
(Continued)

*Primary Examiner* — Richard Tan
(74) *Attorney, Agent, or Firm* — FIG. 1 Patents

(57) ABSTRACT

Various aspects of the present disclosure relate to user equipment (UE) handover from a network energy saving cell. A timeline of different events allows the UE to make a reliable decision on executing a handover to a target cell, e.g., by providing the UE with the knowledge that there is a finite time before the source cell sleeps and therefore measurement or evaluation to find a target cell for handover may continue. For example, a remaining time to sleep (RTS) value may be defined that indicates an amount of time that the source cell remains active after sending a cell switch off indication to the UE. The source cell enters sleep only after the RTS time indicated in the cell switch off indication elapses. The UE remains active in the source cell until the RTS time elapses and performs measurement and measurement evaluation of candidates.

20 Claims, 12 Drawing Sheets

(58) Field of Classification Search
USPC .......................................................... 329/331
See application file for complete search history.

(56) References Cited

FOREIGN PATENT DOCUMENTS

| WO | 2018197097 A1 | 11/2018 |
|---|---|---|
| WO | 2020215325 A1 | 10/2020 |
| WO | 2024176210 A1 | 8/2024 |
| WO | 2025052357 A1 | 3/2025 |

OTHER PUBLICATIONS

3GPP , "New SI: Study on network energy savings for NR", 3GPP TSG RAN Meeting #94e, RP-213554, Electronic Meeting, Dec. 6-17, 2021 [retrieved from the internet on Dec. 27, 2024], <https://www.3gpp.org/ftp/tsg_ran/TSG_RAN/TSGR_94e/Docs>, Dec. 2021, 5 pages.
3GPP , "NW Energy Saving Idle", 3GPP TSG-RAN WG2 Meeting #119 Electronic, Elbonia, Aug. 17-26, 2022, R2-2207546, [retrieved from the internet on Dec. 27, 2024], <https://www.3gpp.org/ftp/tsg_ran/WG2_RL2/TSGR2_119-e/Docs>, Aug. 2022, 3 pages.
3GPP , "Radio Resource Control (RRC) protocol specification", 3rd Generation Partnership Project; Technical Specification Group Radio Access Network, 3GPP TS 38.331 V16.6.0, 3GPP Organizational Partners, Valbonne, France [retrieved Feb. 2, 2022]. Retrieved from the Internet <http://www.3gpp.org>., Sep. 2021, 961 Pages.
GSMA, "5G energy efficiencies: Green is the new black", retrieved from the internet on Jun. 3, 2024, <https://data.gsmaintelligence.com/api-web/v2/research-file-download?id=54165956&file=241120-5G-energy.pdf>, Nov. 2020, 26 pages.
PCT/IB2024/054458 , "International Search Report and Written Opinion", International Application No. PCT/IB2024/054458, Jul. 10, 2024, 15 pages.
"3GPP TS 36.321 V16.0.0", 3rd Generation Partnership Project; Technical Specification Group Radio Access Network; Evolved Universal Terrestrial Radio Access (E-UTRA); Medium Access Control (MAC) protocol specification (Release 16), Retrieved from the Internet: URL:ftp://ftp.3gpp.org/Specs/archive/36_series/36.331 /36331-gOO.zip 36331-gOO.docx, Apr. 6, 2020, 141 pages.
"3rd Generation Partnership Project; Technical Specification Group Radio Access Network; NR. User Equipment (UE) procedures in Idle mode and RRC' 56 Inactive state (Release 16)", 3GPP TS 38.304 V16.7.0 [retrieved Mar. 22, 2023]. Retrieved from the Internet <http://3gpp.org>, Dec. 2021, 39 pages.
"New SI: Study on network energy savings for NR", 3GPP TSG RAN Meeting #94e, RP-213554, Electronic Meeting, Dec. 6-17, 2021 [retrieved from the internet on Dec. 27, 2024], <https://www.3gpp.org/ftp/tsg_ran/TSG_RAN/TSGR_94e/Docs>, Dec. 2021, 5 pages.
"NW Energy Saving IDLE", 3GPP TSG-RAN WG2 Meeting #119 Electronic, Elbonia, Aug. 17-26, 2022, R2-2207546, [retrieved from the internet on Dec. 27, 2024], <https://www.3gpp.org/ftp/tsg_ran/WG2_RL2/TSGR2_119-e/Docs>, Aug. 2022, 3 pages.
"Radio Resource Control (RRC) protocol specification", 3rd Generation Partnership Project; Technical Specification Group Radio Access Network, 3GPP TS 38.331 V16.6.0, 3GPP Organizational Partners, Valbonne, France [retrieved Feb. 2, 2022]. Retrieved from the Internet <http://www.3gpp.org>., Sep. 2021, 961 Pages.
Catt, "Consideration on CHO enhancement for NES", 3GPP TSG-RAN WG2 Meeting #121, R2-2300822, Feb. 27, 2023, 5 pages.
Lenovo, "CHO Procedure in NES Mode", 3GPP TSG-RAN2#122, R2-2305942, May 22, 2023, 4 pages.
Lenovo, "Source and Target side CHO Procedures", 3GPP TSG-RAN WG2 Meeting #123bis, R2-2309573, Oct. 9, 2023, 4 pages.
Nokia, "Connected Mode Mobility for NES", 3GPP TSG-RAN WG2 Meeting #123bis, R2-2310795, Oct. 9, 2023, 28 pages.
"International Search Report and Written Opinion", International Application No. PCT/IB2024/054458, Jul. 10, 2024, 15 pages.
"International Search Report and Written Opinion", International Application No. PCT/IB2024/060436, Feb. 3, 2025, 19 pages.

* cited by examiner

200

300

USER EQUIPMENT HANDOVER FROM A NETWORK ENERGY SAVING CELL

RELATED APPLICATION

This application claims priority to U.S. Patent Application Ser. No. 63/545,616 filed Oct. 25, 2023 entitled "USER EQUIPMENT HANDOVER FROM A NETWORK ENERGY SAVING CELL," the disclosure of which is incorporated by reference herein in its entirety.

TECHNICAL FIELD

The present disclosure relates to wireless communications, and more specifically to user equipment (UE) handover from a network energy saving (NES) cell.

BACKGROUND

A wireless communications system may include one or multiple network communication devices, such as base stations, which may support wireless communications for one or multiple user communication devices, which may be otherwise known as UE, or other suitable terminology. The wireless communications system may support wireless communications with one or multiple user communication devices by utilizing resources of the wireless communication system (e.g., time resources (e.g., symbols, slots, subframes, frames, or the like) or frequency resources (e.g., subcarriers, carriers, or the like). Additionally, the wireless communications system may support wireless communications across various radio access technologies including third generation (3G) radio access technology, fourth generation (4G) radio access technology, fifth generation (5G) radio access technology, among other suitable radio access technologies beyond 5G (e.g., sixth generation (6G)).

The wireless communications system includes numerous devices that consume power. Various different techniques may be used by the different devices in the wireless communications system in order to reduce power usage in the wireless communications system.

SUMMARY

An article "a" before an element is unrestricted and understood to refer to "at least one" of those elements or "one or more" of those elements. The terms "a," "at least one," "one or more," and "at least one of one or more" may be interchangeable. As used herein, including in the claims, "or" as used in a list of items (e.g., a list of items prefaced by a phrase such as "at least one of" or "one or more of" or "one or both of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on". Further, as used herein, including in the claims, a "set" may include one or more elements.

Some implementations of the method and apparatuses described herein may further include a UE for wireless communication. The UE receives, from a network entity, a first signaling indicating a conditional handover configuration that includes one or more handover conditions for one or more candidate cells, a first timer value, and a second timer value; starts a first timer with the first timer value in response to determining that one or more handover conditions indicated in the first signaling are fulfilled for a candidate cell of the one or more candidate cells; receives, from the network entity, a second signaling before expiry of the first timer; and in response to the second signaling, executes handover to the candidate cell, stops the first timer, and starts a second timer with the second timer value.

In some implementations of the method and apparatuses described herein, the UE restarts measuring and evaluating handover conditions for the candidate cell upon expiry of the first timer. Additionally or alternatively, the first signaling includes a radio resource control (RRC) connection reconfiguration message for the one or more candidate cells. Additionally or alternatively, the second signaling comprises a layer 1 signaling. Additionally or alternatively, the one or more handover conditions include one or more measurement events and based on at least one of radio condition evaluation, time condition evaluation, or location condition evaluation. Additionally or alternatively, the candidate cell comprises a target cell in response to determining that the one or more conditions indicated in the first signaling are fulfilled for the candidate cell. Additionally or alternatively, to execute the handover execution is to tune to a frequency of the target cell, synchronize to a downlink channel of the target cell, and initiate a random access channel (RACH) procedure to announce arrival of the UE to the target cell.

Some implementations of the method and apparatuses described herein may further include a UE for wireless communication. The UE receives, from a network entity (NE), a first signaling indicating a conditional handover configuration that includes one or more handover conditions for one or more candidate cells; receives, from the NE, a second signaling indicating start of a sleep time of the NE; and executes handover to a candidate cell after receipt of the second signaling and in response to determining that the one or more handover conditions indicated in the first signaling are fulfilled for the candidate cell.

In some implementations of the method and apparatuses described herein, to execute handover to the candidate cell is to execute handover to the candidate cell after receipt of the second signaling, prior to expiration of a remaining time to sleep (RTS) value, and in response to determining that the one or more handover conditions indicated in the first signaling are fulfilled for the candidate cell. Additionally or alternatively, the second signaling includes the RTS value. Additionally or alternatively, the first signaling includes the RTS value. Additionally or alternatively, the UE receives, from the NE, a discontinuous transmission (DTX) or discontinuous reception (DRX) configuration; and determines the RTS value based at least in part on the DTX or DRX configuration. Additionally or alternatively, the UE receives, from the NE, a downlink control information (DCI) configuration; and determine the RTS value based at least in part on the DCI configuration. Additionally or alternatively, the first signaling includes a RRC connection reconfiguration message for the one or more candidate cells. Additionally or alternatively, the one or more handover conditions include one or more measurement events and based on at least one of radio condition evaluation, time condition evaluation, or location condition evaluation. Additionally or alternatively, the candidate cell comprises a target cell in response to determining that the one or more conditions indicated in the first signaling are fulfilled for the candidate cell. Additionally or alternatively, to execute the handover execution is to tune to a frequency of the target cell, synchronize to a downlink channel of the target cell, and initiate a RACH procedure to announce arrival of the UE to the target cell.

Some implementations of the method and apparatuses described herein may further include a base station for wireless communication. The base station transmits, to a UE, a first signaling indicating a conditional handover configuration that includes one or more handover conditions for one or more candidate cells; and transmits, to the UE, a second signaling indicating start of a sleep time of the base station to cause the UE to execute handover to a candidate cell in response to determining that the one or more handover conditions indicated in the first signaling are fulfilled for the candidate cell.

In some implementations of the method and apparatuses described herein, to execute handover to the candidate cell is to execute handover to the candidate cell after receipt of the second signaling, prior to expiration of a remaining time to sleep (RTS) value, and in response to determining that the one or more handover conditions indicated in the first signaling are fulfilled for the candidate cell. Additionally or alternatively, the second signaling includes the RTS value. Additionally or alternatively, the first signaling includes the RTS value. Additionally or alternatively, the first signaling includes a RRC connection reconfiguration message for the one or more candidate cells. Additionally or alternatively, the one or more handover conditions include one or more measurement events and based on at least one of radio condition evaluation, time condition evaluation, or location condition evaluation. Additionally or alternatively, to execute the handover execution is to tune to a frequency of the candidate cell, synchronize to a downlink channel of the candidate cell, and initiate a RACH procedure to announce arrival of the UE to the candidate cell.

Some implementations of the method and apparatuses described herein may further include a processor for wireless communication. The processor receives, from a network entity, a first signaling indicating a conditional handover configuration that includes one or more handover conditions for one or more candidate cells, a first timer value, and a second timer value; starts a first timer with the first timer value in response to determining that one or more handover conditions indicated in the first signaling are fulfilled for first candidate cell of the one or more candidate cells; receives, from the network entity, a second signaling before expiry of the first timer; and in response to the second signaling, executes handover to the candidate cell, stops the first timer, and starts a second timer with the second timer value.

In some implementations of the method and apparatuses described herein, the processor restarts measuring and evaluating handover conditions for the candidate cell upon expiry of the first timer. Additionally or alternatively, the first signaling includes a RRC connection reconfiguration message for the one or more candidate cells. Additionally or alternatively, the second signaling comprises a layer 1 signaling. Additionally or alternatively, the one or more handover conditions include one or more measurement events and based on at least one of radio condition evaluation, time condition evaluation, or location condition evaluation. Additionally or alternatively, the candidate cell comprises a target cell in response to determining that the one or more conditions indicated in the first signaling are fulfilled for the candidate cell. Additionally or alternatively, to execute the handover execution is to tune to a frequency of the target cell, synchronize to a downlink channel of the target cell, and initiate a RACH procedure to announce arrival of a user equipment that includes the processor to the target cell.

Some implementations of the method and apparatuses described herein may further include a processor for wireless communication. The processor receives, from a NE, a first signaling indicating a conditional handover configuration that includes one or more handover conditions for one or more candidate cells; receives, from the NE, a second signaling indicating start of a sleep time of the NE; and executes handover to a candidate cell after receipt of the second signaling and in response to determining that the one or more handover conditions indicated in the first signaling are fulfilled for the candidate cell.

In some implementations of the method and apparatuses described herein, to execute handover to the candidate cell is to execute handover to the candidate cell after receipt of the second signaling, prior to expiration of a RTS value, and in response to determining that the one or more handover conditions indicated in the first signaling are fulfilled for the candidate cell. Additionally or alternatively, the second signaling includes the RTS value. Additionally or alternatively, the first signaling includes the RTS value. Additionally or alternatively, the processor receives, from the NE, a DTX or DRX configuration; and determines the RTS value based at least in part on the DTX or DRX configuration. Additionally or alternatively, the processor receives, from the NE, a DCI configuration; and determines the RTS value based at least in part on the DCI configuration. Additionally or alternatively, the first signaling includes a RRC connection reconfiguration message for the one or more candidate cells. Additionally or alternatively, the one or more handover conditions include one or more measurement events and based on at least one of radio condition evaluation, time condition evaluation, or location condition evaluation. Additionally or alternatively, the candidate cell comprises a target cell in response to determining that the one or more conditions indicated in the first signaling are fulfilled for the candidate cell. Additionally or alternatively, to execute the handover execution is to tune to a frequency of the target cell, synchronize to a downlink channel of the target cell, and initiate a RACH procedure to announce arrival of a user equipment that includes the processor to the target cell.

Some implementations of the method and apparatuses described herein may further include a method performed by a UE, the method comprising: receiving, from a network entity, a first signaling indicating a conditional handover configuration that includes one or more handover conditions for one or more candidate cells, a first timer value, and a second timer value; starting a first timer with the first timer value in response to determining that one or more handover conditions indicated in the first signaling are fulfilled for a candidate cell of the one or more candidate cells; receiving, from the network entity, a second signaling before expiry of the first timer; and in response to the second signaling, executing handover to the candidate cell, stopping the first timer, and starting a second timer with the second timer value.

In some implementations of the method and apparatuses described herein, the method further comprises: restarting measuring and evaluating handover conditions for the candidate cell upon expiry of the first timer. Additionally or alternatively, the first signaling includes a RRC connection reconfiguration message for the one or more candidate cells. Additionally or alternatively, the second signaling comprises a layer 1 signaling. Additionally or alternatively, the one or more handover conditions include one or more measurement events and based on at least one of radio condition evaluation, time condition evaluation, or location condition evaluation. Additionally or alternatively, the candidate cell comprises a target cell in response to determining that the one or more conditions indicated in the first signaling are fulfilled for the candidate cell. Additionally or alternatively, executing the handover execution comprises tuning to a frequency of the target cell, synchronizing to a downlink channel of the target cell, and initiating a RACH procedure to announce arrival of the UE to the target cell.

Some implementations of the method and apparatuses described herein may further include a method performed by a UE, the method comprising: receiving, from a NE, a first signaling indicating a conditional handover configuration that includes one or more handover conditions for one or more candidate cells; receiving, from the NE, a second signaling indicating start of a sleep time of the NE; and executing handover to a candidate cell after receipt of the second signaling and in response to determining that the one or more handover conditions indicated in the first signaling are fulfilled for the candidate cell.

In some implementations of the method and apparatuses described herein, the method further comprises: executing handover to the candidate cell comprises executing handover to the candidate cell after receipt of the second signaling, prior to expiration of a RTS value, and in response to determining that the one or more handover conditions indicated in the first signaling are fulfilled for the candidate cell. Additionally or alternatively, the second signaling includes the RTS value. Additionally or alternatively, the first signaling includes the RTS value. Additionally or alternatively, the method further comprises receiving, from the NE, a DTX or DRX configuration; and determining the RTS value based at least in part on the DTX or DRX configuration. Additionally or alternatively, the method further comprises receiving, from the NE, a DCI configuration; and determining the RTS value based at least in part on the DCI configuration. Additionally or alternatively, the first signaling includes a RRC connection reconfiguration message for the one or more candidate cells. Additionally or alternatively, the one or more handover conditions include one or more measurement events and based on at least one of radio condition evaluation, time condition evaluation, or location condition evaluation. Additionally or alternatively, the candidate cell comprises a target cell in response to determining that the one or more conditions indicated in the first signaling are fulfilled for the candidate cell. Additionally or alternatively, executing the handover execution comprises tuning to a frequency of the target cell, synchronizing to a downlink channel of the target cell, and initiating a RACH procedure to announce arrival of the UE to the target cell.

Some implementations of the method and apparatuses described herein may further include a method performed by a base station, the method comprising: transmitting, to a UE, a first signaling indicating a conditional handover configuration that includes one or more handover conditions for one or more candidate cells; and transmitting, to the UE, a second signaling indicating start of a sleep time of the base station to cause the UE to execute handover to a candidate cell in response to determining that the one or more handover conditions indicated in the first signaling are fulfilled for the candidate cell.

In some implementations of the method and apparatuses described herein, the method further comprises: executing handover to the candidate cell after receipt of the second signaling, prior to expiration of a RTS value, and in response to determining that the one or more handover conditions indicated in the first signaling are fulfilled for the candidate cell. Additionally or alternatively, the second signaling includes the RTS value. Additionally or alternatively, the first signaling includes the RTS value. Additionally or alternatively, the first signaling includes a RRC connection reconfiguration message for the one or more candidate cells. Additionally or alternatively, the one or more handover conditions include one or more measurement events and based on at least one of radio condition evaluation, time condition evaluation, or location condition evaluation. Additionally or alternatively, executing the handover execution comprises tuning to a frequency of the candidate cell, synchronizing to a downlink channel of the candidate cell, and initiating a RACH procedure to announce arrival of the UE to the candidate cell.

DETAILED DESCRIPTION

Figure 1:
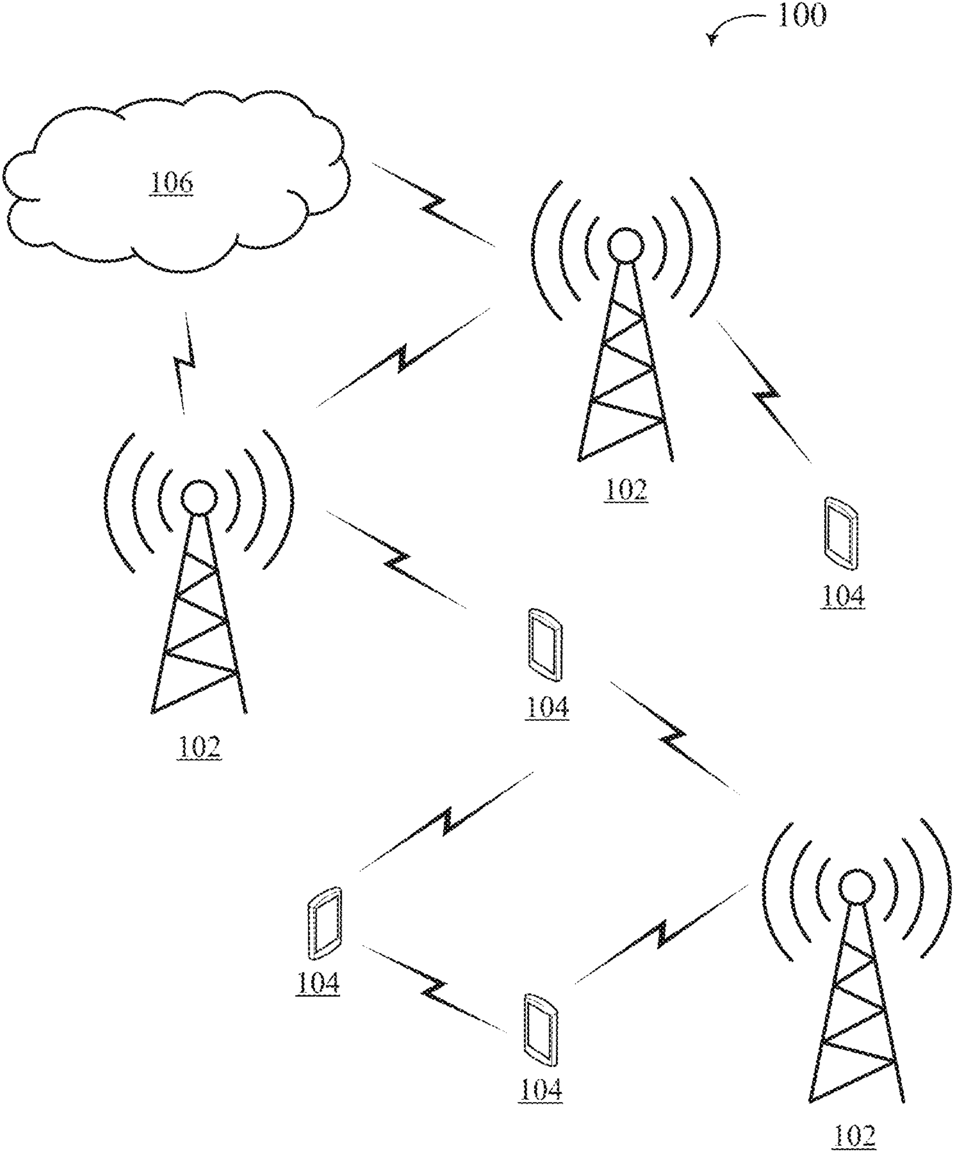
FIG. 1 illustrates an example of a wireless communications system in accordance with aspects of the present disclosure.

A source cell (also referred to as a serving cell) sends a conditional handover configuration (e.g., a RRCReconfiguration message containing conditionalReconfiguration), also referred to as conditional handover (CHO) herein, to a UE but starts a NES technique only some time later, allowing the UEs in the cell sufficient time to evaluate handover conditions contained in the CHO.

In the case of a NES cell switch off based technique, in absence of knowledge of when the source cell is starting to sleep a UE may trigger radio link failure (RLF) as soon as it receives layer 1 (L1) or layer 2 (L2) signaling activating cell switch off if there is no target cell found so far. Or, the UE may pre-maturely trigger RLF, e.g., based on insufficient measurement or evaluation select a handover target which may cause further issues like RLF or a further or immediate required mobility, ping-pong, and so forth. Any such UE behavior may adversely affect the user experience or result in un-necessary UE battery consumption.

The techniques discussed herein develop a timeline of different events thereby allowing the UE to make a reliable decision on executing a handover to a target cell, e.g., by providing the UE with the knowledge that there is a finite time before the source cell sleeps and therefore measurement or evaluation to find a target cell for handover may continue.

In one or more implementations, a remaining time to sleep (RTS) value is defined. The RTS value indicates an amount of time that the source cell remains active after sending a cell switch off indication to the UE. The source cell enters sleep only after (not before) the RTS time indicated in the cell switch off indication (also referred to as cell switch off indication) elapses. The UE remains active in the source cell until the RTS time elapses and performs measurement and measurement evaluation of candidates included in the CHO reconfiguration message. If the measurement evaluation is successful and UE has found a target for handover before the RTS time elapses, a handover execution starts immediately. If not, the UE triggers a radio link failure procedure and attempts to re-establish the RRC Connection immediately after expiry of the RTS time value, where the UE starts timer T311 and tries to find a suitable cell and sends RRC Reestablishment Request message to the found suitable cell, as specified in 3rd Generation Partnership Project (3GPP) Technical Specification (TS) 38.331.

One solution to handle the conditional handover procedure is to carry on with the mobility procedure as in legacy, e.g., using purely the radio condition of the source and one or more candidate cells. This could lead to the UE not being handed over to any cell since the one or more legacy radio conditions may not be satisfied at a time when the source cell had intended to switch to sleep or switch off. Using the techniques discussed herein, the UE is able to make a reliable decision on executing a handover to a target cell, e.g., by providing the UE with the knowledge that there is a finite time before the source cell sleeps and therefore measurement or evaluation to find a target cell for handover may continue.

Aspects of the present disclosure are described in the context of a wireless communications system.

FIG. 1 illustrates an example of a wireless communications system 100 in accordance with aspects of the present disclosure. The wireless communications system 100 may include one or more NE 102, one or more UE 104, and a core network (CN) 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a new radio (NR) network, such as a 5G network, a 5G-Advanced (5G-A) network, or a 5G ultrawideband (5G-UWB) network. In other implementations, the wireless communications system 100 may be a combination of a 4G network and a 5G network, or other suitable radio access technology including Institute of Electrical and Electronics Engineers (IEEE) 802.11 (Wi-Fi), IEEE 802.16 (WiMAX), IEEE 802.20. The wireless communications system 100 may support radio access technologies beyond 5G, for example, 6G. Additionally, the wireless communications system 100 may support technologies, such as time division multiple access (TDMA), frequency division multiple access (FDMA), or code division multiple access (CDMA), etc.

The one or more NE 102 may be dispersed throughout a geographic region to form the wireless communications system 100. One or more of the NE 102 described herein may be or include or may be referred to as a network node, a base station, a network element, a network function, a network entity, a radio access network (RAN), a NodeB, an eNodeB (eNB), a next-generation NodeB (gNB), or other suitable terminology. An NE 102 and a UE 104 may communicate via a communication link, which may be a wireless or wired connection. For example, an NE 102 and a UE 104 may perform wireless communication (e.g., receive signaling, transmit signaling) over a Uu interface.

An NE 102 may provide a geographic coverage area for which the NE 102 may support services for one or more UEs 104 within the geographic coverage area. For example, an NE 102 and a UE 104 may support wireless communication of signals related to services (e.g., voice, video, packet data, messaging, broadcast, etc.) according to one or multiple radio access technologies. In some implementations, an NE 102 may be moveable, for example, a satellite associated with a non-terrestrial network (NTN). In some implementations, different geographic coverage areas associated with the same or different radio access technologies may overlap, but the different geographic coverage areas may be associated with different NE 102.

The one or more UE 104 may be dispersed throughout a geographic region of the wireless communications system 100. A UE 104 may include or may be referred to as a remote unit, a mobile device, a wireless device, a remote device, a subscriber device, a transmitter device, a receiver device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples.

A UE 104 may be able to support wireless communication directly with other UEs 104 over a communication link. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link may be referred to as a sidelink. For example, a UE 104 may support wireless communication directly with another UE 104 over a PC5 interface.

An NE 102 may support communications with the CN 106, or with another NE 102, or both. For example, an NE 102 may interface with other NE 102 or the CN 106 through one or more backhaul links (e.g., S1, N2, N6, or other network interface). In some implementations, the NE 102 may communicate with each other directly. In some other implementations, the NE 102 may communicate with each other indirectly (e.g., via the CN 106). In some implementations, one or more NE 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The CN 106 may support user authentication, access authorization, tracking, connectivity, and other access, routing, or mobility functions. The CN 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a packet data network (PDN) gateway (P-GW), or a user plane function (UPF)). In some implementations, the control plane entity may manage non-access stratum (NAS) functions, such as mobility, authentication, and bearer management (e.g., data bearers, signal bearers, etc.) for the one or more UEs 104 served by the one or more NE 102 associated with the CN 106.

The CN 106 may communicate with a packet data network over one or more backhaul links (e.g., via an S1, N2, N6, or other network interface). The packet data network may include an application server. In some implementations, one or more UEs 104 may communicate with the application server. A UE 104 may establish a session (e.g., a protocol data unit (PDU) session, or the like) with the CN 106 via an NE 102. The CN 106 may route traffic (e.g., control information, data, and the like) between the UE 104 and the application server using the established session (e.g., the established PDU session). The PDU session may be an example of a logical connection between the UE 104 and the CN 106 (e.g., one or more network functions of the CN 106).

In the wireless communications system 100, the NEs 102 and the UEs 104 may use resources of the wireless communications system 100 (e.g., time resources (e.g., symbols, slots, subframes, frames, or the like) or frequency resources (e.g., subcarriers, carriers)) to perform various operations (e.g., wireless communications). In some implementations, the NEs 102 and the UEs 104 may support different resource structures. For example, the NEs 102 and the UEs 104 may support different frame structures. In some implementations, such as in 4G, the NEs 102 and the UEs 104 may support a single frame structure. In some other implementations, such as in 5G and among other suitable radio access technologies, the NEs 102 and the UEs 104 may support various frame structures (i.e., multiple frame structures). The NEs 102 and the UEs 104 may support various frame structures based on one or more numerologies.

One or more numerologies may be supported in the wireless communications system 100, and a numerology may include a subcarrier spacing and a cyclic prefix. A first numerology (e.g., $\mu=0$) may be associated with a first subcarrier spacing (e.g., 15 kHz) and a normal cyclic prefix. In some implementations, the first numerology (e.g., $\mu=0$) associated with the first subcarrier spacing (e.g., 15 kHz) may utilize one slot per subframe. A second numerology (e.g., $\mu=1$) may be associated with a second subcarrier spacing (e.g., 30 kHz) and a normal cyclic prefix. A third numerology (e.g., $\mu=2$) may be associated with a third subcarrier spacing (e.g., 60 kHz) and a normal cyclic prefix or an extended cyclic prefix. A fourth numerology (e.g., $\mu=3$) may be associated with a fourth subcarrier spacing (e.g., 120 kHz) and a normal cyclic prefix. A fifth numerology (e.g., $\mu=4$) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally or alternatively, a time interval of a resource (e.g., a communication resource) may be organized according to slots. For example, a subframe may include a number (e.g., quantity) of slots. The number of slots in each subframe may also depend on the one or more numerologies supported in the wireless communications system 100. For instance, the first, second, third, fourth, and fifth numerologies (i.e., $\mu=0$, $\mu=1$, $\mu=2$, $\mu=3$, $\mu=4$) associated with respective subcarrier spacings of 15 kHz, 30 kHz, 60 kHz, 120 kHz, and 240 kHz may utilize a single slot per subframe, two slots per subframe, four slots per subframe, eight slots per subframe, and 16 slots per subframe, respectively. Each slot may include a number (e.g., quantity) of symbols (e.g., OFDM symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., $\mu=0$) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 MHZ-7.125 GHZ), FR2 (24.25 GHz-52.6 GHZ), FR3 (7.125 GHZ-24.25 GHZ), FR4 (52.6 GHZ-114.25 GHZ), FR4a or FR4-1 (52.6 GHZ-71 GHZ), and FR5 (114.25 GHZ-300 GHz). In some implementations, the NEs 102 and the UEs 104 may perform wireless communications over one or more of the operating frequency bands. In some implementations, FR1 may be used by the NEs 102 and the UEs 104, among other equipment or devices for cellular communications traffic (e.g., control information, data). In some implementations, FR2 may be used by the NEs 102 and the UEs 104, among other equipment or devices for short-range, high data rate capabilities.

FR1 may be associated with one or multiple numerologies (e.g., at least three numerologies). For example, FR1 may be associated with a first numerology (e.g., $\mu=0$), which includes 15 kHz subcarrier spacing; a second numerology (e.g., $\mu=1$), which includes 30 kHz subcarrier spacing; and a third numerology (e.g., $\mu=2$), which includes 60 kHz subcarrier spacing. FR2 may be associated with one or multiple numerologies (e.g., at least 2 numerologies). For example, FR2 may be associated with a third numerology (e.g., $\mu=2$), which includes 60 kHz subcarrier spacing; and a fourth numerology (e.g., $\mu=3$), which includes 120 kHz subcarrier spacing.

A NE 102 provides a serving cell that serves a UE 104. The network entity 102 sends a CHO to the UE 104 that indicates a conditional handover configuration that includes one or more handover conditions. In response to the CHO, the UE 104 starts a measurement or evaluation process to identify one or more candidate cells that satisfy the one or more handover conditions. In response to identifying a candidate cell that satisfies the one or more handover conditions, the UE 104 executes handover to one of the candidate cells in response to receiving a lower layer signaling from the network or other timings as discussed in more detail below.

Emissions and energy consumption from different elements of a telecommunication system is adversely contributing to the climate. Besides, the operating expenses to run a telecommunication services are huge. In telecoms, a number of industry-specific factors rooted in countering rising network costs have further shaped efficiency efforts. Combined with the rising costs of spectrum, capital investment and ongoing RAN maintenance/upgrades, energy-saving measures in network operations may be viewed as necessary rather than nice to have. 5G New Radio (NR) offers a significant energy-efficiency improvement per gigabyte over previous generations of mobility. However, new 5G use cases and the adoption of mm Wave will require more sites and antennas. This leads to the prospect of a more efficient network that could paradoxically result in higher emissions without active intervention.

Network energy saving is of great importance for environmental sustainability, to reduce environmental impact (greenhouse gas emissions), and for operational cost savings. As 5G is becoming pervasive across industries and geographical areas, handling more advanced services and applications requiring very high data rates (e.g., extended reality (XR)), networks are being denser, use more antennas, larger bandwidths, and more frequency bands. It is desirable to keep the environmental impact of 5G under control, and novel solutions to improve network energy savings are to be developed.

Energy consumption has become a key part of the operators' operational expenditure (OPEX). For example, the energy cost on mobile networks may account for approximately 23% of the total operator cost. Most of the energy consumption comes from the radio access network and in particular from the active antenna unit (AAU), with data centers and fiber transport accounting for a smaller share. The power consumption of a radio access can be split into two parts: the dynamic part which is only consumed when data transmission or reception is ongoing, and the static part which is consumed all the time to maintain the necessary operation of the radio access devices, even when the data transmission or reception is not on-going.

Therefore, it is desirable to develop a network energy consumption model especially for the base station, key performance indicators (KPIs), an evaluation methodology and to identify and study network energy savings techniques in targeted deployment scenarios. This should include investigating how to achieve more efficient operation dynamically and/or semi-statically and finer granularity adaptation of transmissions and/or receptions in one or more of network energy saving techniques in time, frequency, spatial, and power domains, with potential support/feedback from UE, potential UE assistance information, and information exchange/coordination over network interfaces.

The potential network energy consumption gains are not only evaluated, but also the impact on network and user performance is also assessed and balanced, e.g., by looking at KPIs such as spectral efficiency, capacity, user perceived throughput (UPT), latency, UE power consumption, complexity, handover performance, call drop rate, initial access performance, service level agreement (SLA) assurance related KPIs, etc.

One of the techniques to improve network energy savings are techniques in time domain, e.g., cell DTX or DRX. Another related technique is cell switch off, e.g., cell sleeps indefinitely, remains in DTX/DRX inactive mode.

Cell DTX or DRX is applied to at least UEs in RRC_CONNECTED state. A periodic cell DTX or DRX (e.g., active, and non-active periods) can be configured by the network entity (e.g., gNB) via UE-specific RRC signaling per serving cell. Below examples on cell DTX or DRX behavior during non-active periods are assumed to be possible options:

Example 1: the network entity (e.g., gNB) is expected to turn off all transmission and reception for data traffic and reference signal during cell DTX or DRX non-active periods.

Example 2: the network entity (e.g., gNB) is expected to turn off its transmission or reception only for data traffic during cell DTX or DRX non-active periods (e.g., the network entity (e.g., gNB) will still transmit or receive reference signals)

Example 3: the network entity (e.g., gNB) is expected to turn off its dynamic data transmission/reception during Cell DTX or DRX non-active periods (e.g., the network entity (e.g., gNB) is expected to still perform transmission or reception in periodic resources, including semi-persistent scheduling (SPS), configured grant-physical uplink shared channel (CG-PUSCH), SR, RACH, and sounding reference signal (SRS)).

Example 4: the network entity (e.g., gNB) is expected to only transmit reference signals (e.g., channel state information reference signal (CSI-RS) for measurement).

The cell DTX or DRX mode can be activated or de-activated via dynamic L1/L2 signaling and UE-specific RRC signaling. Both UE specific and common L1/L2 signaling can be considered for activating or deactivating the cell DTX or DRX mode.

In case of a cell switch off based technique, in absence of knowledge of when the source cell is starting to sleep, a UE may trigger RLF as soon as it receives L1 or L2 signaling activating cell switch off if there is no target cell found so far; or, the may pre-maturely (e.g., based on insufficient measurement or evaluation) select a handover target which may cause further issues like RLF or a further or immediate required mobility, ping-pong, etc. Any such UE behavior may one or more of affect user experience, cause unnecessary UE battery consumption, and so forth.

The techniques discussed herein describe UE and network methods enabling network energy saving without (or by a small amount) adversely affecting user experience if and when a handover procedure is required.

Figure 2:
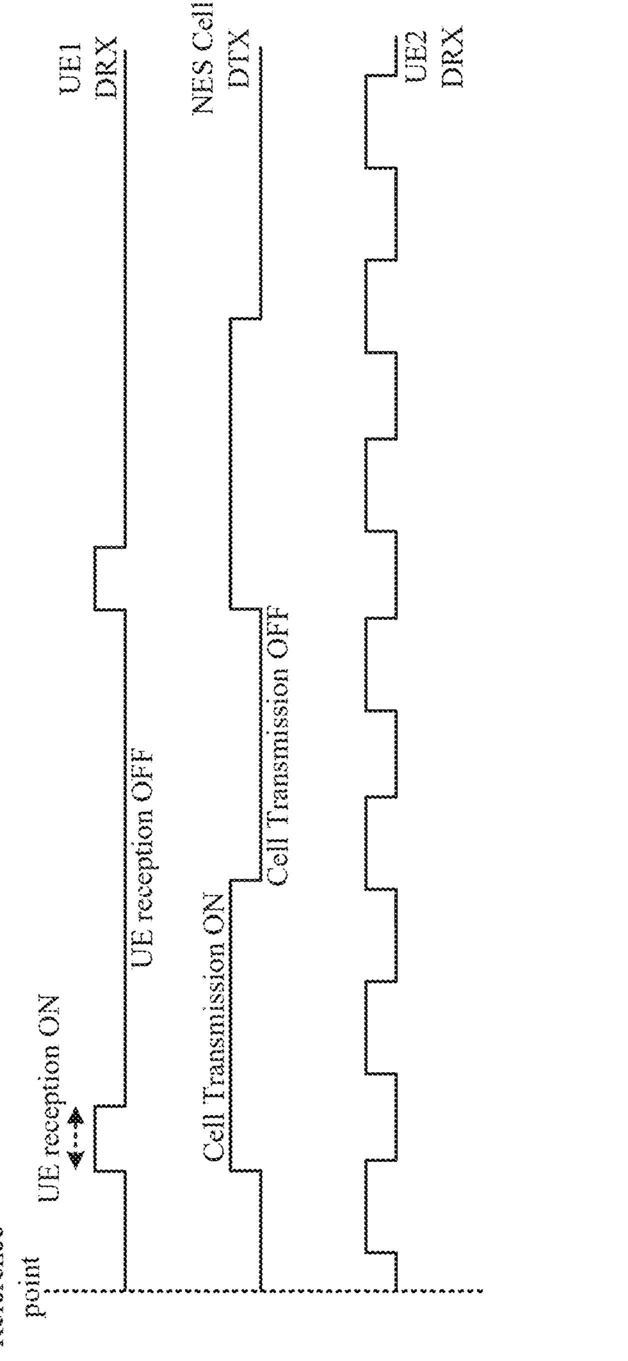
FIG. 2 illustrates an example of two RRC Connected UEs with their corresponding DRX configurations in accordance with aspects of the present disclosure.

FIG. 2 illustrates an example 200 of two RRC Connected UEs with their corresponding DRX configurations in accordance with aspects of the present disclosure. The example 200 shows two RRC Connected UEs with their corresponding DRX configurations, as well as their serving cell in energy saving mode utilizing a DTX configuration. A UE configured with DRX can transmit any time, but when the cell is in DTX the UE may not receive any response back from the network. For example, a UE configured with a DRX configuration can transmit at any time, but it can receive only during certain limited time periods designated as "active time" and shown in the example 200 as "UE reception ON" period. In downlink, the cell is not expected to transmit during "Cell Transmission OFF" periods, referred to as "non-active period" in the previously mentioned examples. To which signals or channels the transmission-off is applied can vary from scenario to scenario and is simply a network implementation. Previous examples on Cell DTX or DRX behavior can be applied by a network vendor and while one vendor may use only one example scenario when saving cell energy, other vendors may reconfigure from one example to another from time to time depending on the current load and other factors. It is therefore up to the network implementation if a network entity (e.g., gNB) is expected to turn off all transmission or reception for data traffic, or turn off all reference signal during Cell DTX or DRX non-active periods—but in any case, the network entity (e.g., gNB) informs UEs being served in the corresponding cell about the current energy saving configuration being (or to be) used in the cell.

Figure 3:
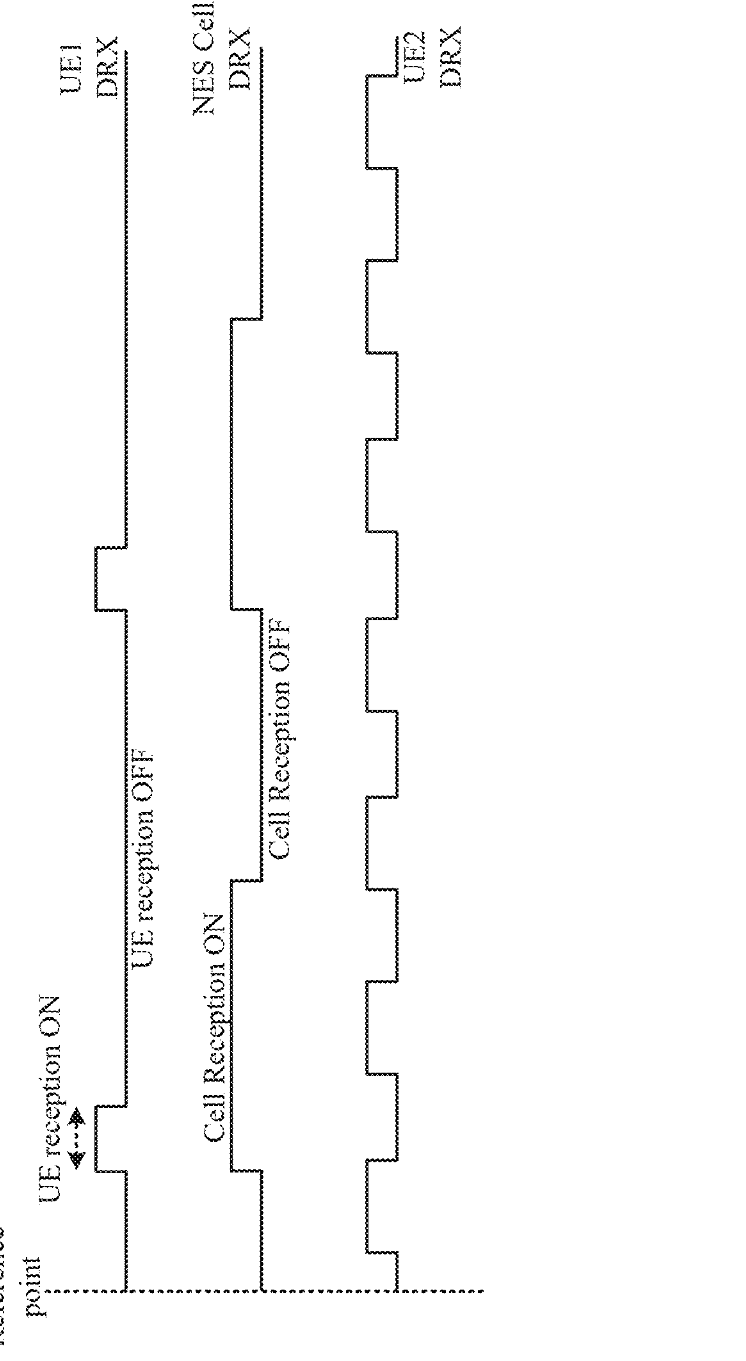
FIG. 3 illustrates an example of two RRC Connected UEs with their corresponding DRX configurations in accordance with aspects of the present disclosure.

FIG. 3 illustrates an example 300 of two RRC Connected UEs with their corresponding DRX configurations in accordance with aspects of the present disclosure. The example 300 shows two RRC Connected UEs with their corresponding DRX configurations, as well as their serving cell in energy saving mode utilizing a DRX configuration. A UE configured with DRX can transmit any time, but when the cell is in DRX the UE transmissions will not be received. For example, a UE configured with a DRX configuration can transmit at any time, but it can receive only during certain limited time periods designated as "active time" and shown in the example 300 as "UE reception ON" period. In uplink, the cell is not expected to receive during "Cell Reception OFF" periods, referred as "non-active period".

In the following the term cell DRX (or network DRX) is used to designate the non-reception generally, the DRX may mean a blanket absence of reception of any or all uplink (UL) transmissions; and the term cell DTX (or network DTX) is used to designate the non-transmission generally without regard to a particular example cited previously, the DTX may mean a blanket stop to all downlink (DL) transmissions or only to specific DL transmissions such as data, control or reference signals, as the case may be.

Apart from the above-mentioned cell DRX and cell DTX technique, another technique may be used where the cell switches off its transmission and reception simultaneously. The cell can switch on again after a while and then start to serve any UEs camped in the cell regularly.

Figure 4:
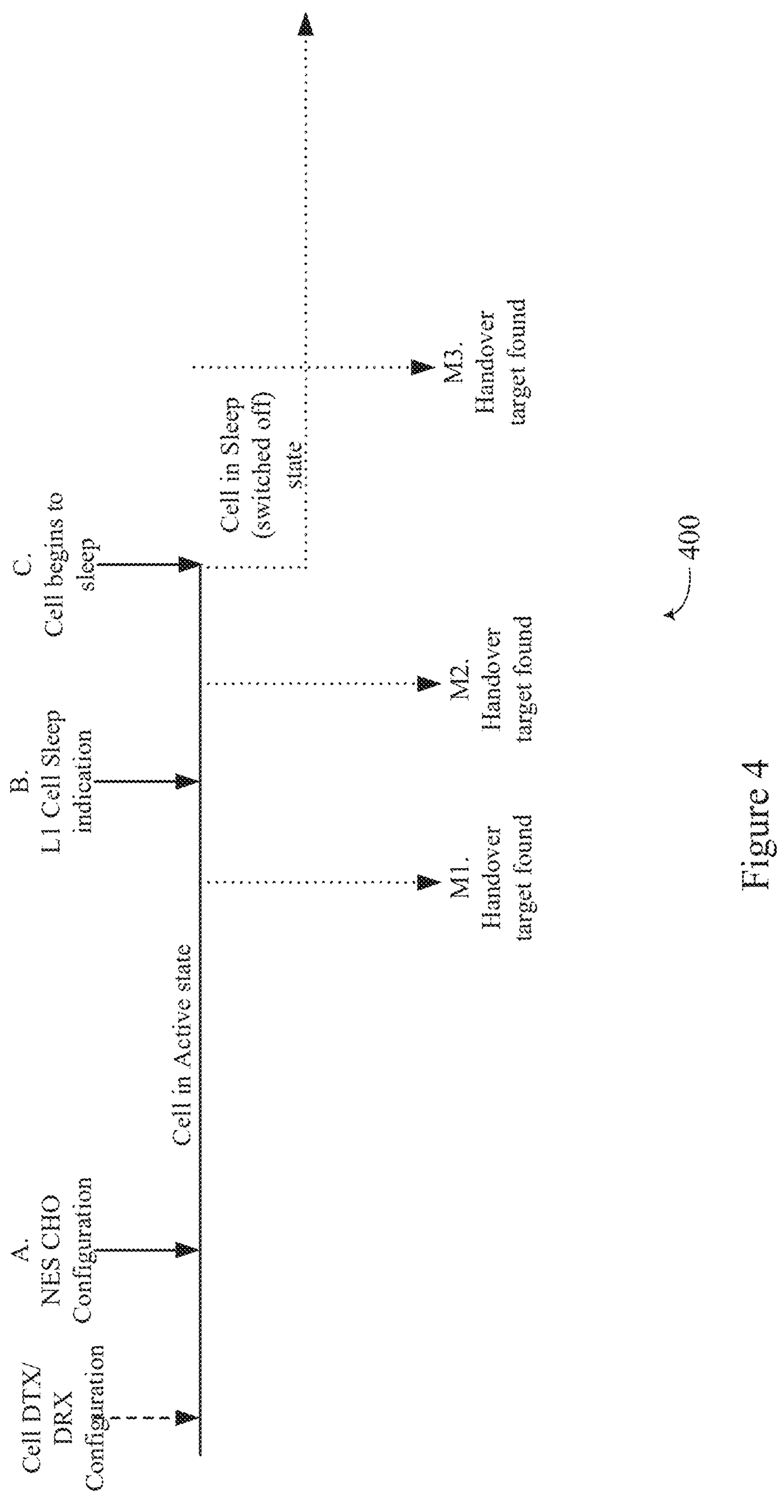
FIG. 4 illustrates an example timeline of NES mobility in accordance with aspects of the present disclosure.

FIG. 4 illustrates an example 400 timeline of NES mobility in accordance with aspects of the present disclosure. In the example 400, a cell sleep may be due to cell DTX or DRX configuration or due to cell switching off. The example 400 shows a general timeline where the UE may have received a RRC signaling containing the Cell DTX or DRX configuration. A UE receives a NES CHO configuration (also referred to as CHO) which is basically a RRC conditional Reconfiguration containing one or more candidate cells with their corresponding one or more handover execution conditions.

Generally, when all of the one or more handover execution conditions included for a candidate is or are fulfilled, the UE starts a timer T304 (included in CHO) and starts to execute handover by starting RACH procedure towards the candidate (target) cell. The RACH procedure can be contention free (CFRA) if the RACH resources (time-frequency physical resources, preamble index etc.) are included in the CHO for the target cell; or it can be contention based (CBRA).

In NES based mobility, e.g., RRC Connected handovers due to serving cell entering an energy saving mode (NES state of mode), before going ahead to execute handover the UE ensures that the cell is or will be entering NES mode. In other words, the handover is made only if the NES mode is actually activated. This can be done directly in the RRC signaling containing the Cell DTX or DRX configuration by explicit signaling and in that case the "L1 Cell Sleep indication" (point 'B') is not required separately. But if the RRC signaling containing the Cell DTX or DRX configuration has deactivated the cell DTX or DRX configuration, then L1 Cell Sleep indication is to be received in the UE to consider the NES mode of the source cell as activated. If the energy saving technique is based purely on the source cell switching off, then the L1 Cell Sleep indication is to be received in the UE to consider the NES mode of the source cell as activated, a RRC signaling configuring cell switch off based network energy saving may not have been sent to the UE.

The example 400 shows three possible time instances (M1, M2 and M3) when measurement evaluation of one or more candidate cells may result into a target cell. These three instances lead to three different scenarios with corresponding UE behavior.

Considering time instance M1 scenario, after having determined positively that a UE's at least one bearer will be impacted, the UE determines neighboring cells that may be used as candidates for handover of this UE. Towards this end, the source cell will initiate handover preparation towards one or more candidate cells. As a result of the handover preparation, a CHO can be sent to the UE. Depending on the employed NES technique, the source cell may also send the cell's NES mode specific information, e.g., Cell DTX or DRX configuration to the UE, which can be done using RRC signaling (as opposed to lower layer signaling) for higher reliability purposes. The Cell DTX or DRX configuration consists of a start offset (an offset from system frame number (SFN) #0, slot or subframe #0 defining when the active or sleep time of the cell first starts), periodicity (how often the DRX/DTX cycle repeats), and on duration length (at least how long is the network active in each DRX/DTX cycle).

Figure 5:
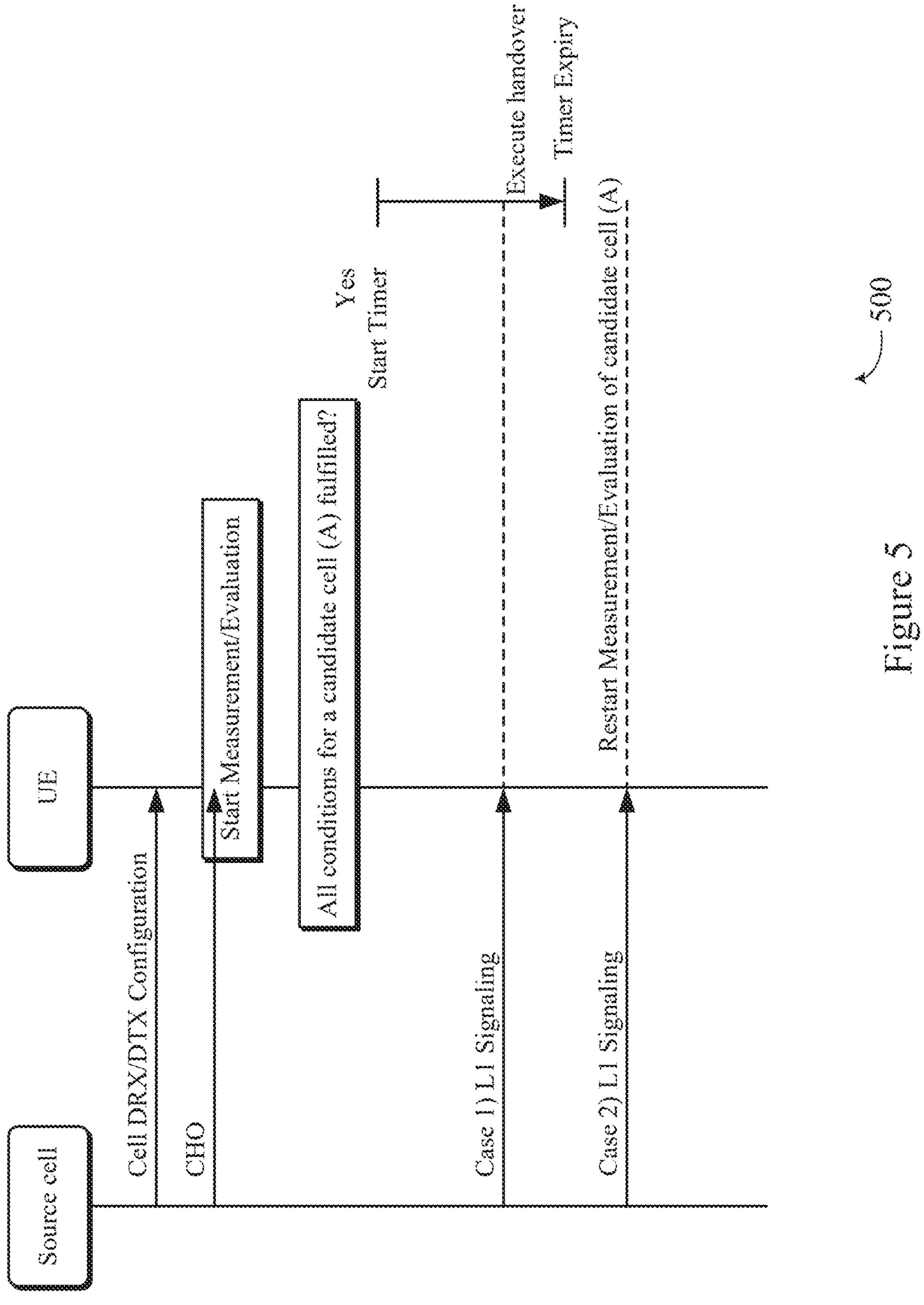
FIG. 5 illustrates an example of handover execution in accordance with aspects of the present disclosure.

FIG. 5 illustrates an example 500 of handover execution in accordance with aspects of the present disclosure. In the example 500, handover is executed only until a trigger after the CHO conditions are fulfilled. L1 Signaling is used as an example of a "trigger".

After receiving the CHO, as shown in the example 500, the UE starts measurements of the candidates included in the CHO and evaluates the one or more conditions contained in the CHO. Once at least one candidate is found for which all of the one or more conditions included in the CHO are considered fulfilled, the UE starts a new-timer. The value of the new-timer is network configured and can be provided by the source cell in CHO or in the RRC signaling providing the Cell DTX or DRX configuration or could be advertised in one of the broadcasted SIBs. If the NES mode of the source cell is triggered before the expiry of this new-timer, the UE starts handover execution towards the cell for which the new-timer is running. The UE considers NES mode of the source cell is triggered, when one of the following occurs:

a) The source cell sends a L1 signaling indicating start of the Cell DTX or DRX. The NES mode of the source cell is considered triggered at the time of reception of the L1 signaling or at the end of a time offset included in the L1 signaling. The time offset could be of absolute value, e.g., in milliseconds (ms), in the form of a future SFN and slots or subframe number, or in slots or subframe offset for the sub-carrier spacing (SCS) in use and is applied from the point of receiving the L1 command.

b) The source cell sends a L1 signaling indicating start of the sleep time for a corresponding Cell DTX or DRX. The NES mode of the source cell is considered triggered at the time of reception of the L1 signaling or at the end of a time offset included in the L1 signaling. The time offset could be of absolute value, e.g., in ms, in the form of a future SFN and slots or subframe number, or in slots or subframe offset for the SCS in use and is applied from the point of receiving the L1 command.

c) The source cell sends a L1 signaling indicating start of the sleep time (for the case where NES technique uses cell switch off). The NES mode of the source cell is considered triggered at the time of reception of the L1 signaling or at the end of a time offset included in the L1 signaling. The time offset could be of absolute value, e.g., in ms, in the form of a future SFN and slots or subframe number, or in slots or subframe offset for the SCS in use and is applied from the point of receiving the L1 command.

d) The cell is entering sleep time which the UE determines itself based on the received start offset Cell DTX or DRX.

As one enhancement, instead of the new-timer started only for the first candidate cell fulfilling all its corresponding one or more conditions, one instance of the new-timer per candidate cell (for which all corresponding one or more conditions included in the CHO are considered fulfilled) is used or started. If there is more than one cell for which as many new-timer instances are running, the UE may choose to execute handover towards the candidate cell for which the new-timer was started most recently, e.g., the candidate cell (which now becomes a target cell) which has most recently fulfilled the handover conditions. This ensures that the measurements and therefore the radio conditions towards this cell are still most relevant. As another UE implementation in this situation, the UE chooses to execute handover towards a candidate cell that has a best (e.g., highest) reference signal receive power (RSRP) or reference signal received quality (RSRQ) value among all the candidate cells fulfilling their corresponding one or more conditions included in the CHO.

If the new-timer for a corresponding candidate expires but the handover is not executed, the UE may start measurement and/or measurement evaluation for the candidate immediately, as shown in example 500 of FIG. 5.

In one or more implementations, the UE starts handover execution no earlier than at point 'B' for the M1 scenario (e.g., in a scenario where the target cell is found before point 'B'). For the M2 and M3 scenarios however, the handover execution starts only at points M2 or M3, as the case may be, e.g., when a handover target is found after the point 'B'.

The handover execution here refers to:

stop any running new-timer, start timer T304 for the corresponding SpCell (primary cell (PCell) or primary and secondary cells (PSCell), e.g., a candidate cell) with the timer value set to 1304, as included in the ReconfigurationWithSync of the corresponding SpCell; used to oversee the handover completion procedure, start synchronizing to the DL of the target SpCell start UL synchronization, e.g., using RACH procedure towards the target/SpCell, etc. as specified in 3GPP TS 38.331.

The second timer (which is basically T304 in TS 38.331) is started when handover is to be executed. So, this could be at any of the points B (for M1)/M2 or M3. The first timer should still be running at this point (to ensure that measurement of the candidate/target cell is still valid and not stale). At handover execution start, the first timer is stopped and the second one is started. The second timer is per UE. If there are many cells for which the first timer might be running (since these cells have fulfilled the CHO condition), the UE decides to execute handover ultimately for only one of these—and the second timer is started. The first timer for any remaining (non-execution) cells may be kept running and may become useful to try handover on another candidate cell (B) if the handover to the first one has failed, T304 (second timer) and the first timer for the candidate cell (B) is still running.

Figure 6:
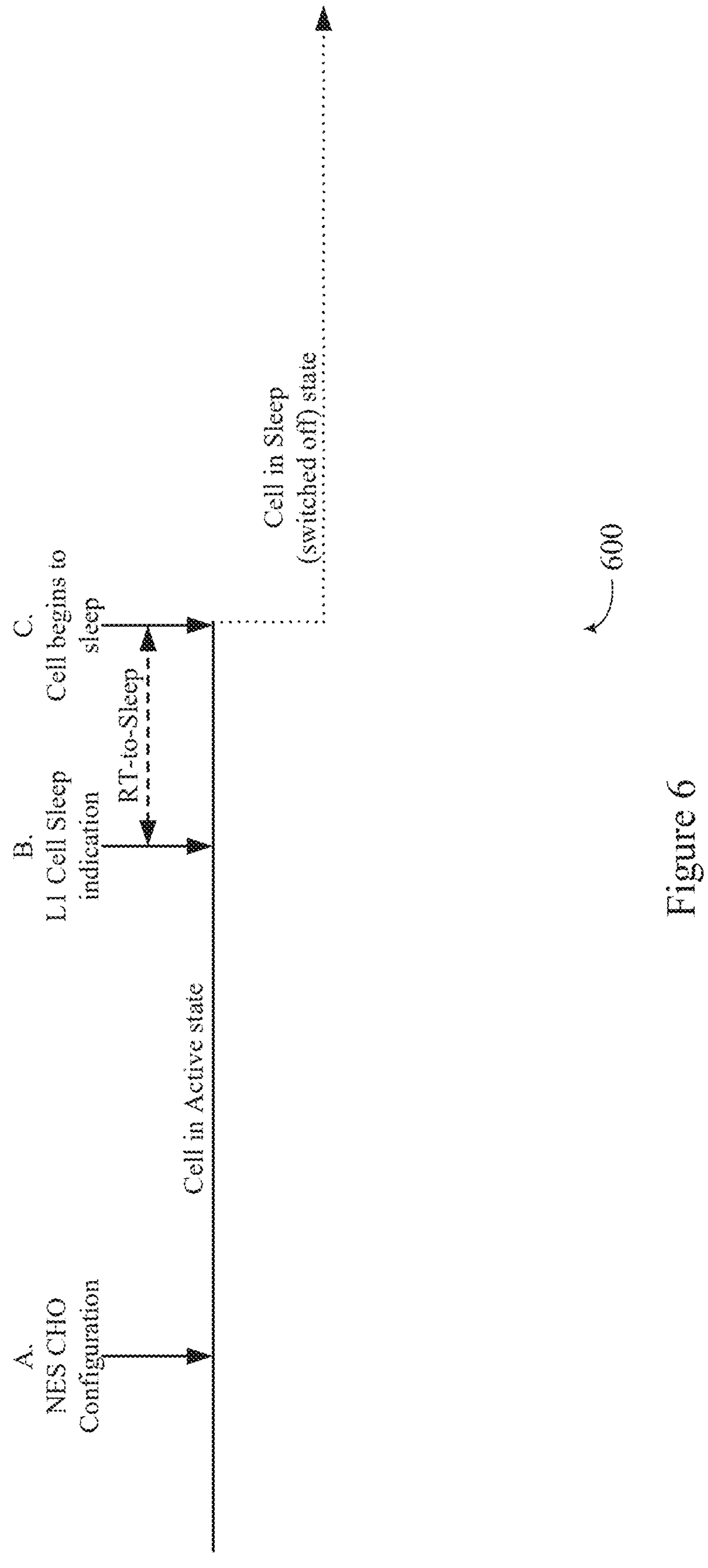
FIG. 6 illustrates an example of a RTS in accordance with aspects of the present disclosure.

FIG. 6 illustrates an example 600 of a RTS in accordance with aspects of the present disclosure. In the example 600, a timeline indicating RTS of the source cell is illustrated. In one or more implementations, as shown in example 500, a RTS value, as a first alternative, is included with the cell switch off indication by the network to the UE. Additionally or alternatively, the RTS may be configured to the UE in NES CHO configuration. Additionally or alternatively, the RTS may be determined by the UE as the first or next instance of cell entering sleep (non-active time) after point 'B' based on received cell DTX or DRX configuration. A cell DTX or DRX configuration consists of drx-onDurationTimer, start offset and cycle time or periodicity and so using these parameters the UE can determine and chart network activity or sleep cycle. Additionally or alternatively, the RTS is made known to the UE by way of specification, e.g., 'x' ms/slots from the time of reception of cell switch off indication. Additionally or alternatively, the RTS may be configured using a RRC Reconfiguration message, possibly also including a cell DTX or DRX configuration, indicating DCI configuration for a group common DCI signaling for one or more cells or cell groups utilizing cell switch off based energy saving.

The time value indicates a minimum time that the source cell remains active after sending the cell switch off indication to the UE; the source cell enters sleep only after (not before) the time indicated in the cell switch off indication. The UE remains active in the source cell until the corresponding time (point 'C'), e.g., performs radio link monitoring, monitors physical downlink control channel (PDCCH), makes one or more UL transmissions using configured grant resources or using dynamic grant received, receives DL semi-persistent scheduling (SPS), makes necessary physical uplink control channel (PUCCH) transmission for providing hybrid automatic repeat request (HARQ) Ack or Nack, channel state information (CSI) feedback, etc., and performs measurement and measurement evaluation of candidates included in the CHO reconfiguration message.

If the measurement evaluation is successful and the UE has found a target for handover until point 'C', a handover execution starts immediately.

If not, the UE triggers a radio link failure procedure and attempts to re-establish the RRC Connection immediately after point 'C', where it starts timer T311 at point 'C' and tries to find a suitable cell, sends RRC Reestablishment Request message to the found suitable cell, as specified in 3GPP TS 38.331. In one or more implementations, the UE may execute handover to a target cell if the same is found based on the measurement evaluation continuing until timer T311. To this end measurement and measurement evaluation of candidates continues beyond point 'C' T311. Additionally or alternatively, the UE performs cell selection while timer T311 is running, and if any of the found suitable cell is one of the candidates included in the CHO, the UE starts handover execution to the same cell, instead of transmitting RRC Reestablishment Request message to the cell.

In one or more implementations, a RRC Connected UE upon receiving cell switch off indication, selects the best radio candidate cell as handover target based on the measurements made until this point of time (point 'B'), if a target cell is not found among the candidates included in the CHO fulfilling the corresponding one or more handover conditions. The best radio candidate cell is, for example, the cell with a highest RSRP or RSRQ value.

In one or more implementations, a RRC Connected UE after receiving cell switch off indication selects the best radio candidate cell as handover target based on the measurements made until point of time (point 'C'), if a target cell is not found among the candidates included in the CHO fulfilling the corresponding one or more handover conditions. The RTS may have been signaled using any of the methods mentioned earlier.

In one or more implementations, a RRC Connected UE after receiving cell switch off indication selects the best radio candidate cell as handover target based on the measurements made until point of time (point 'C') plus timer T311, if a target cell is not found among the candidates included in the CHO fulfilling the corresponding one or more handover conditions. The RTS may have been signaled using any of the methods mentioned earlier and the timer T311 is started upon reception of cell switch off indication.

In one or more implementations, the UE waits until point 'C' for executing handover, even if a suitable CHO target was determined as a result of measurement evaluation earlier. This ensures that the UE maximizes its stay in the source cell. Additionally or alternatively, the UE maximizes its stay in the source cell only if and until the source cell radio remains above a certain radio threshold. The radio threshold is configured by the network using any of the previously mentioned RRC signaling.

Accordingly, the UE starts handover execution no earlier than receiving L1 Activation command for Cell Switch activation, even if a handover target was found previously—and is still considered a valid handover target (e.g., freshness of measurements is controlled using a new-timer).

Additionally or alternatively, a RTS is defined. The RTS time value indicates a time until when the source cell remains active after sending the cell switch off indication to the UE. The UE remains active in the source cell until this time and performs measurement and measurement evaluation of candidates. If the measurement evaluation is successful and the UE has found a target for handover until point 'C', a handover execution starts immediately. If not, the UE triggers a radio link failure procedure and attempts to re-establish the RRC Connection immediately after point 'C', where it starts timer T311 at point 'C'. In one or more implementations, the UE may execute handover to a target cell if the same is found based on the measurement evaluation continuing until timer T311. Additionally or alternatively, the UE performs cell selection during timer T311 is running, and if any of the found suitable cell is one of the candidates included in the CHO, the UE starts handover execution to the same cell, instead of transmitting RRC Reestablishment Request message to it.

Additionally or alternatively, a RRC Connected UE upon receiving cell switch off indication, selects the best radio candidate cell as handover target based on the measurements made until point B/C/C+T311 (best among worst).

Additionally or alternatively, the UE waits until point RTS for executing handover, even if a suitable CHO target was determined as a result of measurement evaluation earlier. This ensures that the UE maximizes its stay in the source cell. Additionally or alternatively, the UE maximizes its stay in the source cell only if and until the source cell radio remains above a certain radio threshold.

Figure 7:
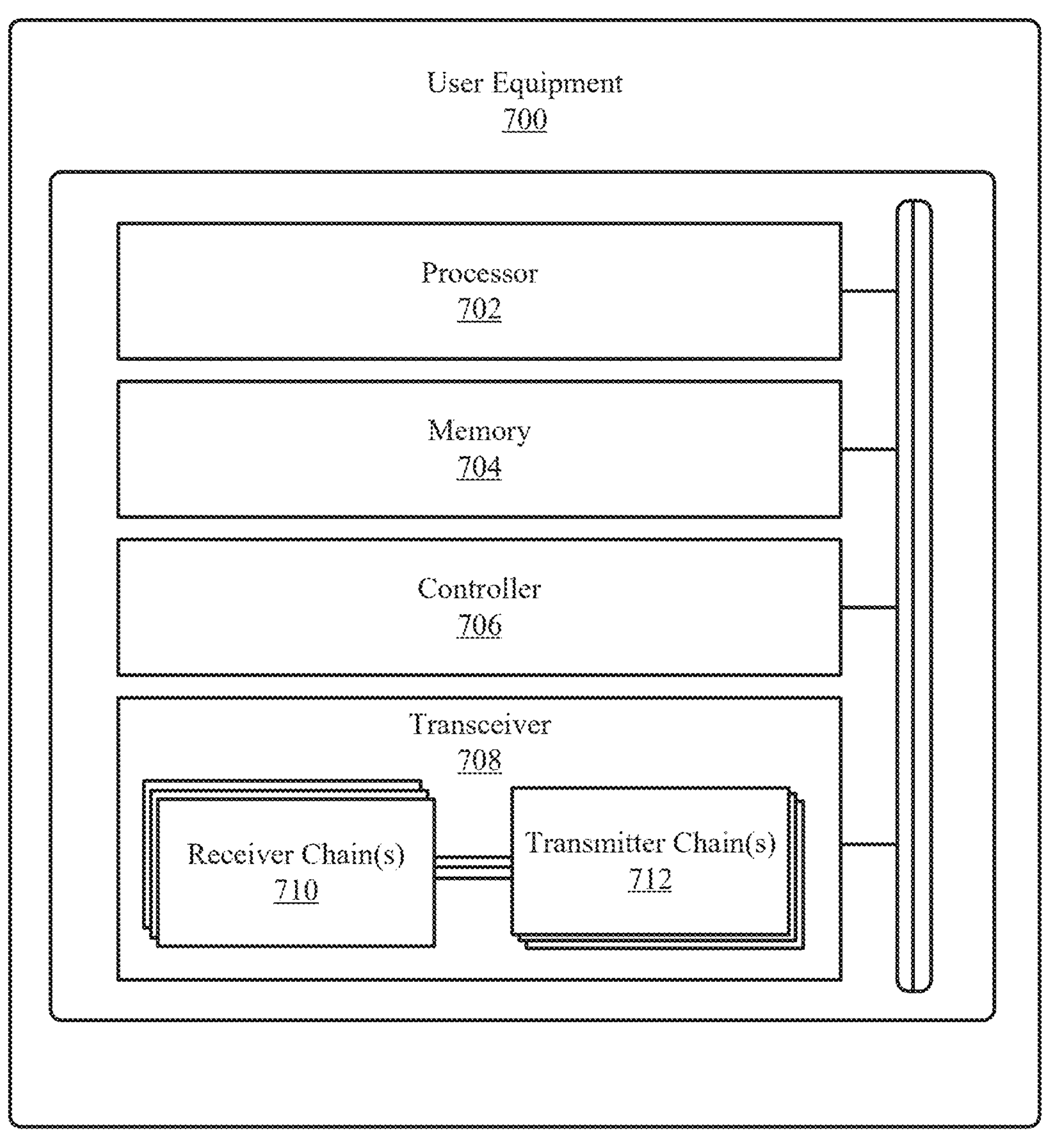
FIG. 7 illustrates an example of a UE in accordance with aspects of the present disclosure.

FIG. 7 illustrates an example of a UE 700 in accordance with aspects of the present disclosure. The UE 700 may include a processor 702, a memory 704, a controller 706, and a transceiver 708. The processor 702, the memory 704, the controller 706, or the transceiver 708, or various combinations thereof or various components thereof may be examples of means for performing various aspects of the present disclosure as described herein. These components may be coupled (e.g., operatively, communicatively, functionally, electronically, electrically) via one or more interfaces.

The processor 702, the memory 704, the controller 706, or the transceiver 708, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 702 may include an intelligent hardware device (e.g., a general-purpose processor, a DSP, a CPU, an ASIC, an FPGA, or any combination thereof). In some implementations, the processor 702 may be configured to operate the memory 704. In some other implementations, the memory 704 may be integrated into the processor 702. The processor 702 may be configured to execute computer-readable instructions stored in the memory 704 to cause the UE 700 to perform various functions of the present disclosure.

The memory 704 may include volatile or non-volatile memory. The memory 704 may store computer-readable, computer-executable code including instructions when executed by the processor 702 cause the UE 700 to perform various functions described herein. The code may be stored in a non-transitory computer-readable medium such as the memory 704 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 702 and the memory 704 coupled with the processor 702 may be configured to cause the UE 700 to perform one or more of the functions described herein (e.g., executing, by the processor 702, instructions stored in the memory 704). For example, the processor 702 may support wireless communication at the UE 700 in accordance with examples as disclosed herein. The UE 700 may be configured to support a means for receiving, from a network entity, a first signaling indicating a conditional handover configuration that includes one or more handover conditions for one or more candidate cells, a first timer value, and a second timer value; starting a first timer with the first timer value in response to determining that one or more handover conditions indicated in the first signaling are fulfilled for a candidate cell of the one or more candidate cells; receiving, from the network entity, a second signaling before expiry of the first timer; and in response to the second signaling, executing handover to the candidate cell, stopping the first timer, and starting a second timer with the second timer value.

Additionally, the UE 700 may be configured to support any one or combination of restarting measuring and evaluating handover conditions for the candidate cell upon expiry of the first timer; where the first signaling includes a RRC connection reconfiguration message for the one or more candidate cells; where the second signaling comprises a layer 1 signaling; where the one or more handover conditions include one or more measurement events and based on at least one of radio condition evaluation, time condition evaluation, or location condition evaluation; where the candidate cell comprises a target cell in response to determining that the one or more conditions indicated in the first signaling are fulfilled for the candidate cell; where executing the handover execution comprises tuning to a frequency of the target cell, synchronizing to a downlink channel of the target cell, and initiating a RACH procedure to announce arrival of the UE to the target cell.

The UE 700 may be configured to support a means for receiving, from a NE, a first signaling indicating a conditional handover configuration that includes one or more handover conditions for one or more candidate cells; receiving, from the NE, a second signaling indicating start of a sleep time of the NE; and executing handover to a candidate cell after receipt of the second signaling and in response to determining that the one or more handover conditions indicated in the first signaling are fulfilled for the candidate cell.

Additionally, the UE 700 may be configured to support any one or combination of where executing handover to the candidate cell comprises executing handover to the candidate cell after receipt of the second signaling, prior to expiration of a RTS value, and in response to determining that the one or more handover conditions indicated in the first signaling are fulfilled for the candidate cell; where the second signaling includes the RTS value; where the first signaling includes the RTS value; receiving, from the NE, a DTX or DRX configuration; and determining the RTS value based at least in part on the DTX or DRX configuration; receiving, from the NE, a DCI configuration; and determining the RTS value based at least in part on the DCI configuration; where the first signaling includes a RRC connection reconfiguration message for the one or more candidate cells; where the one or more handover conditions include one or more measurement events and based on at least one of radio condition evaluation, time condition evaluation, or location condition evaluation; where the candidate cell comprises a target cell in response to determining that the one or more conditions indicated in the first signaling are fulfilled for the candidate cell; where executing the handover execution comprises tuning to a frequency of the target cell, synchronizing to a downlink channel of the target cell, and initiating a RACH procedure to announce arrival of the UE to the target cell.

Additionally, or alternatively, the UE 700 may support to receive, from a network entity, a first signaling indicating a conditional handover configuration that includes one or more handover conditions for one or more candidate cells, a first timer value, and a second timer value; start a first timer with the first timer value in response to determining that one or more handover conditions indicated in the first signaling are fulfilled for a candidate cell of the one or more candidate cells; receive, from the network entity, a second signaling before expiry of the first timer; and in response to the second signaling, execute handover to the candidate cell, stop the first timer, and start a second timer with the second timer value.

Additionally, the UE 700 may be configured to support any one or combination of cause the UE to restart measuring and evaluating handover conditions for the candidate cell upon expiry of the first timer; where the first signaling includes a RRC connection reconfiguration message for the one or more candidate cells; where the second signaling comprises a layer 1 signaling; where the one or more handover conditions include one or more measurement events and based on at least one of radio condition evaluation, time condition evaluation, or location condition evaluation; where the candidate cell comprises a target cell in response to determining that the one or more conditions indicated in the first signaling are fulfilled for the candidate cell; where to execute the handover execution is to tune to a frequency of the target cell, synchronize to a downlink channel of the target cell, and initiate a RACH procedure to announce arrival of the UE to the target cell.

Additionally, or alternatively, the UE 700 may support to receive, from a NE, a first signaling indicating a conditional handover configuration that includes one or more handover conditions for one or more candidate cells; receive, from the NE, a second signaling indicating start of a sleep time of the NE; and execute handover to a candidate cell after receipt of the second signaling and in response to determining that the one or more handover conditions indicated in the first signaling are fulfilled for the candidate cell.

Additionally, the UE 700 may be configured to support any one or combination of where to execute handover to the candidate cell is to execute handover to the candidate cell after receipt of the second signaling, prior to expiration of a RTS value, and in response to determining that the one or more handover conditions indicated in the first signaling are fulfilled for the candidate cell; where the second signaling includes the RTS value; where the first signaling includes the RTS value; receive, from the NE, a DTX or DRX configuration; and determine the RTS value based at least in part on the DTX or DRX configuration; receive, from the NE, a DCI configuration; and determine the RTS value based at least in part on the DCI configuration; where the first signaling includes a RRC connection reconfiguration message for the one or more candidate cells; where the one or more handover conditions include one or more measurement events and based on at least one of radio condition evaluation, time condition evaluation, or location condition evaluation; where the candidate cell comprises a target cell in response to determining that the one or more conditions indicated in the first signaling are fulfilled for the candidate cell; where to execute the handover execution is to tune to a frequency of the target cell, synchronize to a downlink channel of the target cell, and initiate a RACH procedure to announce arrival of the UE to the target cell.

The controller 706 may manage input and output signals for the UE 700. The controller 706 may also manage peripherals not integrated into the UE 700. In some implementations, the controller 706 may utilize an operating system such as iOS®, ANDROID®, WINDOWS®, or other operating systems. In some implementations, the controller 706 may be implemented as part of the processor 702.

In some implementations, the UE 700 may include at least one transceiver 708. In some other implementations, the UE 700 may have more than one transceiver 708. The transceiver 708 may represent a wireless transceiver. The transceiver 708 may include one or more receiver chains 710, one or more transmitter chains 712, or a combination thereof.

A receiver chain 710 may be configured to receive signals (e.g., control information, data, packets) over a wireless medium. For example, the receiver chain 710 may include one or more antennas to receive a signal over the air or wireless medium. The receiver chain 710 may include at least one amplifier (e.g., a low-noise amplifier (LNA)) configured to amplify the received signal. The receiver chain 710 may include at least one demodulator configured to demodulate the receive signal and obtain the transmitted data by reversing the modulation technique applied during transmission of the signal. The receiver chain 710 may include at least one decoder for decoding the demodulated signal to receive the transmitted data.

A transmitter chain 712 may be configured to generate and transmit signals (e.g., control information, data, packets). The transmitter chain 712 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 712 may also include at least one power amplifier configured to amplify the modulated signal to an appropriate power level suitable for transmission over the wireless medium. The transmitter chain 712 may also include one or more antennas for transmitting the amplified signal into the air or wireless medium.

Figure 8:
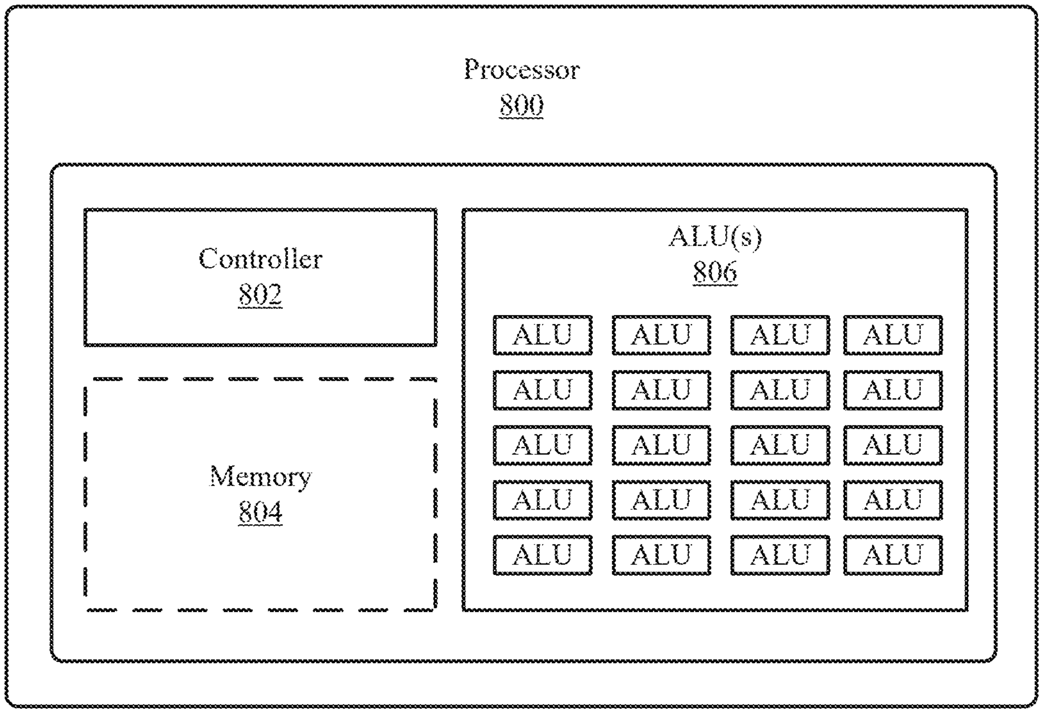
FIG. 8 illustrates an example of a processor in accordance with aspects of the present disclosure.

FIG. 8 illustrates an example of a processor 800 in accordance with aspects of the present disclosure. The processor 800 may be an example of a processor configured to perform various operations in accordance with examples as described herein. The processor 800 may include a controller 802 configured to perform various operations in accordance with examples as described herein. The processor 800 may optionally include at least one memory 804, which may be, for example, an L1/L2/L3 cache. Additionally, or alternatively, the processor 800 may optionally include one or more arithmetic-logic units (ALUs) 806. One or more of these components may be in electronic communication or otherwise coupled (e.g., operatively, communicatively, functionally, electronically, electrically) via one or more interfaces (e.g., buses).

The processor 800 may be a processor chipset and include a protocol stack (e.g., a software stack) executed by the processor chipset to perform various operations (e.g., receiving, obtaining, retrieving, transmitting, outputting, forwarding, storing, determining, identifying, accessing, writing, reading) in accordance with examples as described herein. The processor chipset may include one or more cores, one or more caches (e.g., memory local to or included in the processor chipset (e.g., the processor 800) or other memory (e.g., random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others).

The controller 802 may be configured to manage and coordinate various operations (e.g., signaling, receiving, obtaining, retrieving, transmitting, outputting, forwarding, storing, determining, identifying, accessing, writing, reading) of the processor 800 to cause the processor 800 to support various operations in accordance with examples as described herein. For example, the controller 802 may operate as a control unit of the processor 800, generating control signals that manage the operation of various components of the processor 800. These control signals include enabling or disabling functional units, selecting data paths, initiating memory access, and coordinating timing of operations.

The controller 802 may be configured to fetch (e.g., obtain, retrieve, receive) instructions from the memory 804 and determine subsequent instruction(s) to be executed to cause the processor 800 to support various operations in accordance with examples as described herein. The controller 802 may be configured to track memory addresses of instructions associated with the memory 804. The controller 802 may be configured to decode instructions to determine the operation to be performed and the operands involved. For example, the controller 802 may be configured to interpret the instruction and determine control signals to be output to other components of the processor 800 to cause the processor 800 to support various operations in accordance with examples as described herein. Additionally, or alternatively, the controller 802 may be configured to manage flow of data within the processor 800. The controller 802 may be configured to control transfer of data between registers, ALUs 806, and other functional units of the processor 800.

The memory 804 may include one or more caches (e.g., memory local to or included in the processor 800 or other memory, such as RAM, ROM, DRAM, SDRAM, SRAM, MRAM, flash memory, etc. In some implementations, the memory 804 may reside within or on a processor chipset (e.g., local to the processor 800). In some other implementations, the memory 804 may reside external to the processor chipset (e.g., remote to the processor 800).

The memory 804 may store computer-readable, computer-executable code including instructions that, when executed by the processor 800, cause the processor 800 to perform various functions described herein. The code may be stored in a non-transitory computer-readable medium such as system memory or another type of memory. The controller 802 and/or the processor 800 may be configured to execute computer-readable instructions stored in the memory 804 to cause the processor 800 to perform various functions. For example, the processor 800 and/or the controller 802 may be coupled with or to the memory 804, the processor 800, and the controller 802, and may be configured to perform various functions described herein. In some examples, the processor 800 may include multiple processors and the memory 804 may include multiple memories. One or more of the multiple processors may be coupled with one or more of the multiple memories, which may, individually or collectively, be configured to perform various functions herein.

The one or more ALUs 806 may be configured to support various operations in accordance with examples as described herein. In some implementations, the one or more ALUs 806 may reside within or on a processor chipset (e.g., the processor 800). In some other implementations, the one or more ALUs 806 may reside external to the processor chipset (e.g., the processor 800). One or more ALUs 806 may perform one or more computations such as addition, subtraction, multiplication, and division on data. For example, one or more ALUs 806 may receive input operands and an operation code, which determines an operation to be executed. One or more ALUs 806 may be configured with a variety of logical and arithmetic circuits, including adders, subtractors, shifters, and logic gates, to process and manipulate the data according to the operation. Additionally, or alternatively, the one or more ALUs 806 may support logical operations such as AND, OR, exclusive-OR (XOR), not-OR (NOR), and not-AND (NAND), enabling the one or more ALUs 806 to handle conditional operations, comparisons, and bitwise operations.

The processor 800 may support wireless communication in accordance with examples as disclosed herein. The processor 800 may be configured to or operable to: receive, from a network entity, a first signaling indicating a conditional handover configuration that includes one or more handover conditions for one or more candidate cells, a first timer value, and a second timer value; start a first timer with the first timer value in response to determining that one or more handover conditions indicated in the first signaling are fulfilled for first candidate cell of the one or more candidate cells; receive, from the network entity, a second signaling before expiry of the first timer; and in response to the second signaling, execute handover to the candidate cell, stop the first timer, and start a second timer with the second timer value.

Additionally, the processor 800 may be configured to support any one or combination of where the at least one controller is configured to cause the processor to restart measuring and evaluating handover conditions for the candidate cell upon expiry of the first timer; where the first signaling includes a RRC connection reconfiguration message for the one or more candidate cells; where the second signaling comprises a layer 1 signaling; where the one or more handover conditions include one or more measurement events and based on at least one of radio condition evaluation, time condition evaluation, or location condition evaluation; where the candidate cell comprises a target cell in response to determining that the one or more conditions indicated in the first signaling are fulfilled for the candidate cell; where to execute the handover execution is to tune to a frequency of the target cell, synchronize to a downlink channel of the target cell, and initiate a RACH procedure to announce arrival of a user equipment that includes the processor to the target cell.

The processor 800 may support wireless communication in accordance with examples as disclosed herein. The processor 800 may be configured to or operable to: receive, from a NE, a first signaling indicating a conditional handover configuration that includes one or more handover conditions for one or more candidate cells; receive, from the NE, a second signaling indicating start of a sleep time of the NE; and execute handover to a candidate cell after receipt of the second signaling and in response to determining that the one or more handover conditions indicated in the first signaling are fulfilled for the candidate cell.

Additionally, the processor 800 may be configured to support any one or combination of where to execute handover to the candidate cell is to execute handover to the candidate cell after receipt of the second signaling, prior to expiration of a RTS value, and in response to determining that the one or more handover conditions indicated in the first signaling are fulfilled for the candidate cell; where the second signaling includes the RTS value; where the first signaling includes the RTS value; receive, from the NE, a DTX or DRX configuration; and determine the RTS value based at least in part on the DTX or DRX configuration; receive, from the NE, a DCI configuration; and determine the RTS value based at least in part on the DCI configuration; where the first signaling includes a RRC connection reconfiguration message for the one or more candidate cells; where the one or more handover conditions include one or more measurement events and based on at least one of radio condition evaluation, time condition evaluation, or location condition evaluation; where the candidate cell comprises a target cell in response to determining that the one or more conditions indicated in the first signaling are fulfilled for the candidate cell; where to execute the handover execution is to tune to a frequency of the target cell, synchronize to a downlink channel of the target cell, and initiate a RACH procedure to announce arrival of a user equipment that includes the processor to the target cell.

Figure 9:
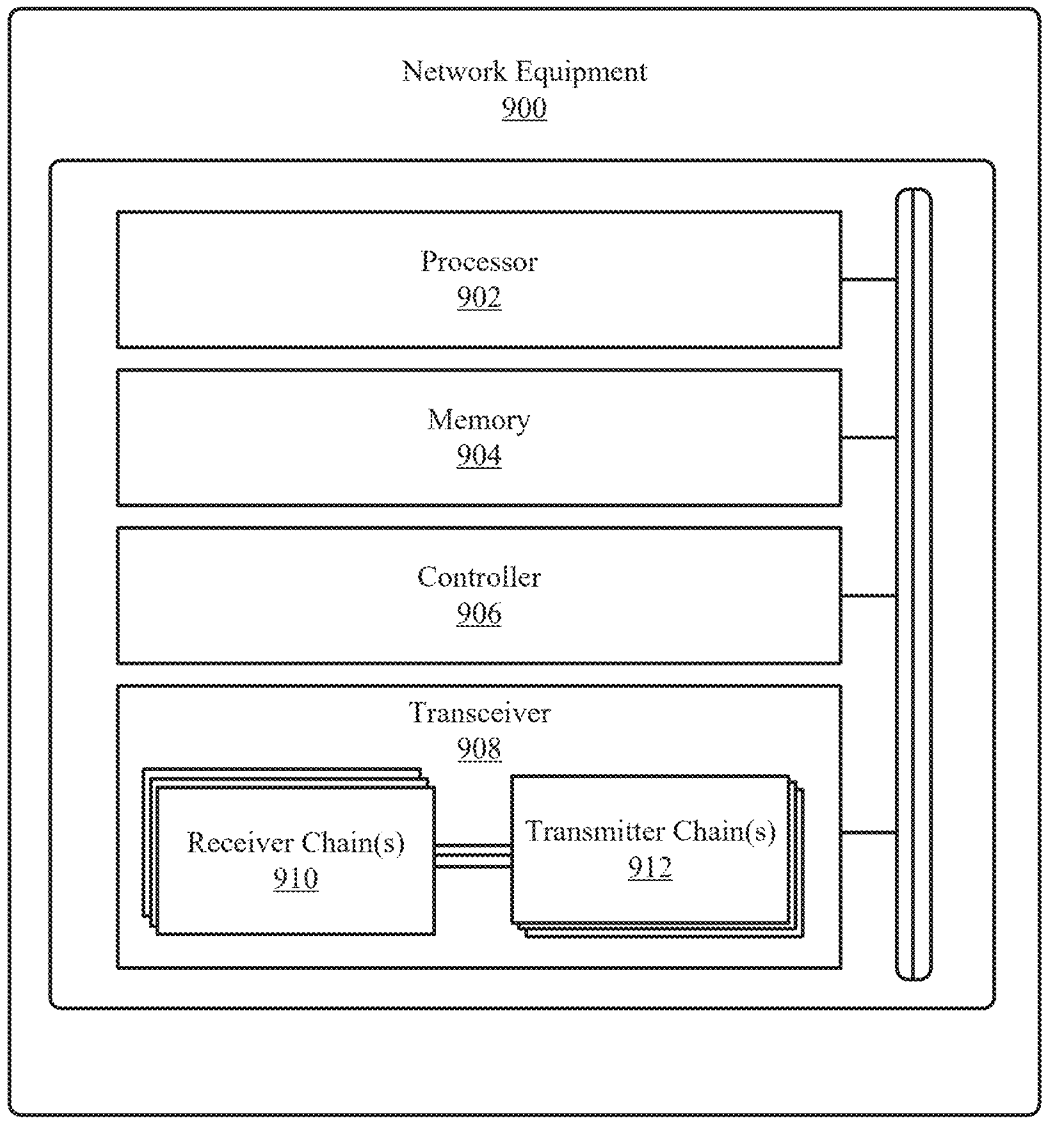
FIG. 9 illustrates an example of a network equipment (NE) in accordance with aspects of the present disclosure.

FIG. 9 illustrates an example of a NE 900 in accordance with aspects of the present disclosure. The NE 900 may include a processor 902, a memory 904, a controller 906, and a transceiver 908. The processor 902, the memory 904, the controller 906, or the transceiver 908, or various combinations thereof or various components thereof may be examples of means for performing various aspects of the present disclosure as described herein. These components may be coupled (e.g., operatively, communicatively, functionally, electronically, electrically) via one or more interfaces.

The processor 902, the memory 904, the controller 906, or the transceiver 908, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 902 may include an intelligent hardware device (e.g., a general-purpose processor, a DSP, a CPU, an ASIC, an FPGA, or any combination thereof). In some implementations, the processor 902 may be configured to operate the memory 904. In some other implementations, the memory 904 may be integrated into the processor 902. The processor 902 may be configured to execute computer-readable instructions stored in the memory 904 to cause the NE 900 to perform various functions of the present disclosure.

The memory 904 may include volatile or non-volatile memory. The memory 904 may store computer-readable, computer-executable code including instructions when executed by the processor 902 cause the NE 900 to perform various functions described herein. The code may be stored in a non-transitory computer-readable medium such as the memory 904 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 902 and the memory 904 coupled with the processor 902 may be configured to cause the NE 900 to perform one or more of the functions described herein (e.g., executing, by the processor 902, instructions stored in the memory 904). For example, the processor 902 may support wireless communication at the NE 900 in accordance with examples as disclosed herein. The NE 900 may be configured to support a means for transmitting, to a UE, a first signaling indicating a conditional handover configuration that includes one or more handover conditions for one or more candidate cells; and transmitting, to the UE, a second signaling indicating start of a sleep time of the base station to cause the UE to execute handover to a candidate cell in response to determining that the one or more handover conditions indicated in the first signaling are fulfilled for the candidate cell.

Additionally, the NE 900 may be configured to support any one or combination of where executing handover to the candidate cell comprises executing handover to the candidate cell after receipt of the second signaling, prior to expiration of a RTS value, and in response to determining that the one or more handover conditions indicated in the first signaling are fulfilled for the candidate cell; where the second signaling includes the RTS value; where the first signaling includes the RTS value; where the first signaling includes a RRC connection reconfiguration message for the one or more candidate cells; where the one or more handover conditions include one or more measurement events and based on at least one of radio condition evaluation, time condition evaluation, or location condition evaluation; where executing the handover execution comprises tuning to a frequency of the candidate cell, synchronizing to a downlink channel of the candidate cell, and initiating a RACH procedure to announce arrival of the UE to the candidate cell.

Additionally, or alternatively, the NE 900 may support to transmit, to a UE, a first signaling indicating a conditional handover configuration that includes one or more handover conditions for one or more candidate cells; and transmit, to the UE, a second signaling indicating start of a sleep time of the base station to cause the UE to execute handover to a candidate cell in response to determining that the one or more handover conditions indicated in the first signaling are fulfilled for the candidate cell.

Additionally, the NE 900 may be configured to support any one or combination of where to execute handover to the candidate cell is to execute handover to the candidate cell after receipt of the second signaling, prior to expiration of a RTS value, and in response to determining that the one or more handover conditions indicated in the first signaling are fulfilled for the candidate cell; where the second signaling includes the RTS value; where the first signaling includes the RTS value; where the first signaling includes a RRC connection reconfiguration message for the one or more candidate cells; where the one or more handover conditions include one or more measurement events and based on at least one of radio condition evaluation, time condition evaluation, or location condition evaluation; where to execute the handover execution is to tune to a frequency of the candidate cell, synchronize to a downlink channel of the candidate cell, and initiate a RACH procedure to announce arrival of the UE to the candidate cell.

The controller 906 may manage input and output signals for the NE 900. The controller 906 may also manage peripherals not integrated into the NE 900. In some implementations, the controller 906 may utilize an operating system such as iOS®, ANDROID®, WINDOWS®, or other operating systems. In some implementations, the controller 906 may be implemented as part of the processor 902.

In some implementations, the NE 900 may include at least one transceiver 908. In some other implementations, the NE 900 may have more than one transceiver 908. The transceiver 908 may represent a wireless transceiver. The transceiver 908 may include one or more receiver chains 910, one or more transmitter chains 912, or a combination thereof.

A receiver chain 910 may be configured to receive signals (e.g., control information, data, packets) over a wireless medium. For example, the receiver chain 910 may include one or more antennas to receive a signal over the air or wireless medium. The receiver chain 910 may include at least one amplifier (e.g., a low-noise amplifier (LNA)) configured to amplify the received signal. The receiver chain 910 may include at least one demodulator configured to demodulate the receive signal and obtain the transmitted data by reversing the modulation technique applied during transmission of the signal. The receiver chain 910 may include at least one decoder for decoding the demodulated signal to receive the transmitted data.

A transmitter chain 912 may be configured to generate and transmit signals (e.g., control information, data, packets). The transmitter chain 912 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 912 may also include at least one power amplifier configured to amplify the modulated signal to an appropriate power level suitable for transmission over the wireless medium. The transmitter chain 912 may also include one or more antennas for transmitting the amplified signal into the air or wireless medium.

Figure 10:
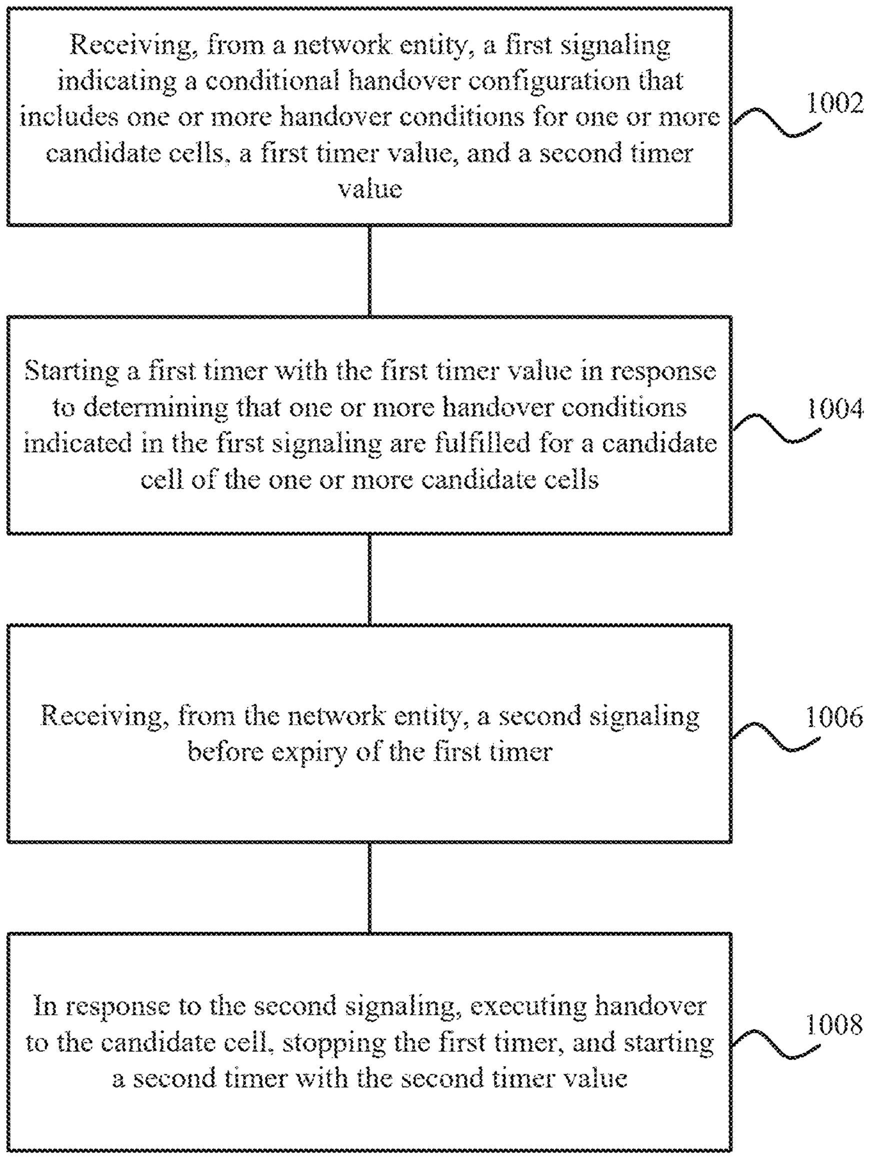
FIG. 10 illustrates a flowchart of a method performed by a UE in accordance with aspects of the present disclosure.

FIG. 10 illustrates a flowchart of a method in accordance with aspects of the present disclosure. The operations of the method may be implemented by a UE as described herein. In some implementations, the UE may execute a set of instructions to control the function elements of the UE to perform the described functions.

At 1002, the method may include receiving, from a network entity, a first signaling indicating a conditional handover configuration that includes one or more handover conditions for one or more candidate cells, a first timer value, and a second timer value. The operations of 1002 may be performed in accordance with examples as described herein. In some implementations, aspects of the operations of 1002 may be performed by a UE as described with reference to FIG. 7.

At 1004, the method may include starting a first timer with the first timer value in response to determining that one or more handover conditions indicated in the first signaling are fulfilled for a candidate cell of the one or more candidate cells. The operations of 1004 may be performed in accordance with examples as described herein. In some implementations, aspects of the operations of 1004 may be performed by a UE as described with reference to FIG. 7.

At 1006, the method may include receiving, from the network entity, a second signaling before expiry of the first timer. The operations of 1006 may be performed in accordance with examples as described herein. In some implementations, aspects of the operations of 1006 may be performed a UE as described with reference to FIG. 7.

At 1008, the method may include in response to the second signaling, executing handover to the candidate cell, stopping the first timer, and starting a second timer with the second timer value. The operations of 1008 may be performed in accordance with examples as described herein. In some implementations, aspects of the operations of 1008 may be performed a UE as described with reference to FIG. 7.

It should be noted that the method described herein describes a possible implementation, and that the operations and the steps may be rearranged or otherwise modified and that other implementations are possible.

Figure 11:
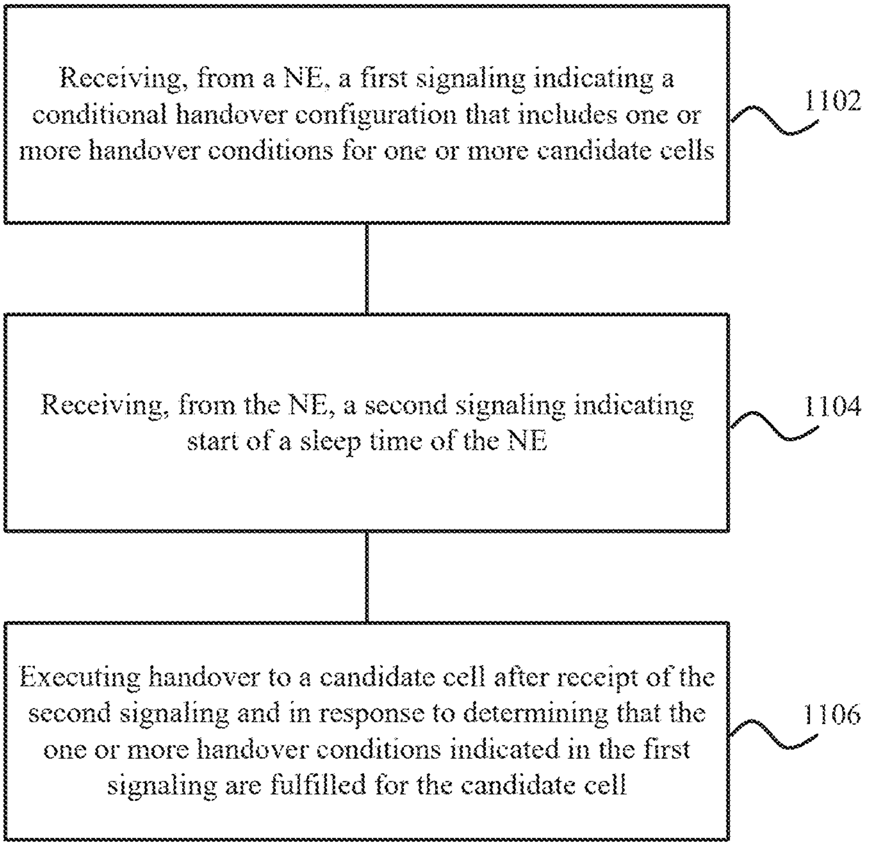
FIG. 11 illustrates a flowchart of a method performed by a UE in accordance with aspects of the present disclosure.

FIG. 11 illustrates a flowchart of a method in accordance with aspects of the present disclosure. The operations of the method may be implemented by a UE as described herein. In some implementations, the UE may execute a set of instructions to control the function elements of the UE to perform the described functions.

At 1102, the method may include receiving, from a NE, a first signaling indicating a conditional handover configuration that includes one or more handover conditions for one or more candidate cells. The operations of 1102 may be performed in accordance with examples as described herein. In some implementations, aspects of the operations of 1102 may be performed by a UE as described with reference to FIG. 7.

At 1104, the method may include receiving, from the NE, a second signaling indicating start of a sleep time of the NE. The operations of 1104 may be performed in accordance with examples as described herein. In some implementations, aspects of the operations of 1104 may be performed by a UE as described with reference to FIG. 7.

At 1106, the method may include executing handover to a candidate cell after receipt of the second signaling and in response to determining that the one or more handover conditions indicated in the first signaling are fulfilled for the candidate cell. The operations of 1106 may be performed in accordance with examples as described herein. In some implementations, aspects of the operations of 1106 may be performed a UE as described with reference to FIG. 7.

Figure 12:
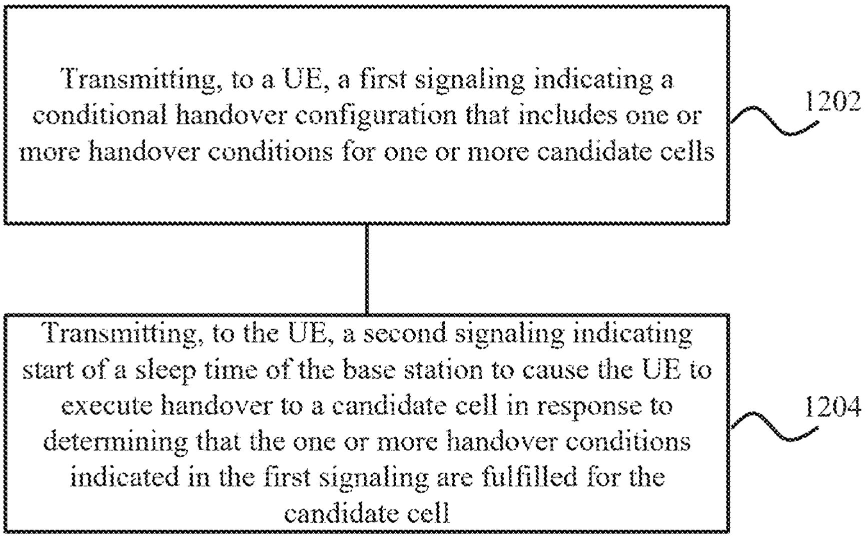
FIG. 12 illustrates a flowchart of a method performed by a NE in accordance with aspects of the present disclosure.

FIG. 12 illustrates a flowchart of a method in accordance with aspects of the present disclosure. The operations of the method may be implemented by a NE as described herein. In some implementations, the NE may execute a set of instructions to control the function elements of the NE to perform the described functions.

At 1202, the method may include transmitting, to a UE, a first signaling indicating a conditional handover configuration that includes one or more handover conditions for one or more candidate cells. The operations of 1202 may be performed in accordance with examples as described herein. In some implementations, aspects of the operations of 1202 may be performed by a NE as described with reference to FIG. 9.

At 1204, the method may include transmitting, to the UE, a second signaling indicating start of a sleep time of the base station to cause the UE to execute handover to a candidate cell in response to determining that the one or more handover conditions indicated in the first signaling are fulfilled for the candidate cell. The operations of 1204 may be performed in accordance with examples as described herein. In some implementations, aspects of the operations of 1204 may be performed by a NE as described with reference to FIG. 9.

It should be noted that the method described herein describes a possible implementation, and that the operations and the steps may be rearranged or otherwise modified and that other implementations are possible.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
- at least one memory; and
- at least one processor coupled with the at least one memory and configured to cause the UE to:
  - receive, from a network entity, a first signaling indicating a conditional handover configuration that includes one or more handover conditions for one or more candidate cells, a first timer value, and a second timer value;
  - start a first timer with the first timer value in response to determining that the one or more handover conditions indicated in the first signaling are fulfilled for a candidate cell of the one or more candidate cells;
  - receive, from the network entity, a second signaling before expiry of the first timer; and
  - in response to the second signaling, execute handover to the candidate cell, stop the first timer, and start a second timer with the second timer value.

2. The UE of claim 1, wherein the at least one processor is configured to cause the UE to restart measuring and evaluating handover conditions for the candidate cell upon expiry of the first timer.

3. The UE of claim 1, wherein the first signaling includes a radio resource control (RRC) connection reconfiguration message for the one or more candidate cells.

4. The UE of claim 1, wherein the second signaling comprises a layer 1 signaling.

5. The UE of claim 1, wherein the one or more handover conditions include one or more measurement events and based on at least one of radio condition evaluation, time condition evaluation, or location condition evaluation.

6. The UE of claim 1, wherein the candidate cell comprises a target cell in response to determining that the one or more handover conditions indicated in the first signaling are fulfilled for the candidate cell.

7. The UE of claim 6, wherein to execute the handover execution is to tune to a frequency of the target cell, synchronize to a downlink channel of the target cell, and initiate a random access channel (RACH) procedure to announce arrival of the UE to the target cell.

8. A user equipment (UE) for wireless communication, comprising:
- at least one memory; and
- at least one processor coupled with the at least one memory and configured to cause the UE to:
  - receive, from a network entity (NE), a first signaling indicating a conditional handover configuration that includes one or more handover conditions for one or more candidate cells;
  - receive, from the NE, a second signaling indicating start of a sleep time of the NE; and
  - execute handover to a candidate cell of the one or more candidate cells after receipt of the second signaling and in response to determining that the one or more handover conditions indicated in the first signaling are fulfilled for the candidate cell.

9. The UE of claim 8, wherein to execute handover to the candidate cell is to execute handover to the candidate cell after receipt of the second signaling, prior to expiration of a remaining time to sleep (RTS) value, and in response to determining that the one or more handover conditions indicated in the first signaling are fulfilled for the candidate cell.

10. The UE of claim 9, wherein the second signaling includes the RTS value.

11. The UE of claim 9, wherein the first signaling includes the RTS value.

12. The UE of claim 9, wherein the at least one processor is configured to cause the UE to:
- receive, from the NE, a discontinuous transmission (DTX) or discontinuous reception (DRX) configuration; and
- determine the RTS value based at least in part on the discontinuous transmission (DTX) or discontinuous reception (DRX) configuration.

13. The UE of claim 9, wherein the at least one processor is configured to cause the UE to:
- receive, from the NE, a downlink control information (DCI) configuration; and
- determine the RTS value based at least in part on the DCI configuration.

14. The UE of claim 8, wherein the one or more handover conditions include one or more measurement events and based on at least one of radio condition evaluation, time condition evaluation, or location condition evaluation.

15. The UE of claim 8, wherein the candidate cell comprises a target cell in response to determining that the one or more conditions indicated in the first signaling are fulfilled for the candidate cell.

16. The UE of claim 15, wherein to execute the handover execution is to tune to a frequency of the target cell, synchronize to a downlink channel of the target cell, and initiate a random access channel (RACH) procedure to announce arrival of the UE to the target cell.

17. A base station for wireless communication, comprising:
  at least one memory; and
  at least one processor coupled with the at least one memory and configured to cause the base station to:
    transmit, to a user equipment (UE), a first signaling indicating a conditional handover configuration that includes one or more handover conditions for one or more candidate cells; and
    transmit, to the UE, a second signaling indicating start of a sleep time of the base station to cause the UE to execute handover to a candidate cell of the one or more candidate cells in response to determining that the one or more handover conditions indicated in the first signaling are fulfilled for the candidate cell.

18. The base station of claim 17, wherein the one or more handover conditions include one or more measurement events and based on at least one of radio condition evaluation, time condition evaluation, or location condition evaluation.

19. A processor for wireless communication, comprising:
  at least one controller coupled with at least one memory and configured to cause the processor to:
    receive, from a network entity, a first signaling indicating a conditional handover configuration that includes one or more handover conditions for one or more candidate cells, a first timer value, and a second timer value;
    start a first timer with the first timer value in response to determining that the one or more handover conditions indicated in the first signaling are fulfilled for a first candidate cell of the one or more candidate cells;
    receive, from the network entity, a second signaling before expiry of the first timer; and
    in response to the second signaling, execute handover to the first candidate cell, stop the first timer, and start a second timer with the second timer value.

20. The processor of claim 19, wherein the at least one controller is configured to cause the processor to restart measuring and evaluating handover conditions for the first candidate cell upon expiry of the first timer.

* * * * *